(12) United States Patent
Kikuchi et al.

(10) Patent No.: US 11,077,793 B2
(45) Date of Patent: Aug. 3, 2021

(54) REARVIEW DISPLAY DEVICE, REARVIEW DISPLAY METHOD, AND PROGRAM

(71) Applicant: SHARP KABUSHIKI KAISHA, Sakai (JP)

(72) Inventors: Kazuma Kikuchi, Sakai (JP); Tomoya Shimura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/566,147

(22) Filed: Sep. 10, 2019

(65) Prior Publication Data
US 2020/0086792 A1    Mar. 19, 2020

Related U.S. Application Data

(60) Provisional application No. 62/731,541, filed on Sep. 14, 2018.

(51) Int. Cl.
| | |
|---|---|
| *B60R 1/00* | (2006.01) |
| *B60R 1/12* | (2006.01) |
| *H04N 5/57* | (2006.01) |
| *H04N 5/262* | (2006.01) |
| *H04N 5/445* | (2011.01) |
| *G06T 7/70* | (2017.01) |
| *H04N 21/47* | (2011.01) |
| *H04N 21/431* | (2011.01) |

(52) U.S. Cl.
CPC ............... *B60R 1/00* (2013.01); *B60R 1/12* (2013.01); *G06T 7/70* (2017.01); *H04N 5/2628* (2013.01); *H04N 5/57* (2013.01); *H04N 21/4316* (2013.01); *H04N 21/47* (2013.01); *B60R 2001/1215* (2013.01); *B60R 2300/30* (2013.01); *B60R 2300/8066* (2013.01); *G06T 2207/30201* (2013.01); *G06T 2207/30268* (2013.01)

(58) Field of Classification Search
None
See application file for complete search history.

(56) References Cited

U.S. PATENT DOCUMENTS

| | | | | |
|---|---|---|---|---|
| 4,180,931 | A * | 1/1980 | Osch ...................... | G02B 30/56 40/219 |
| 5,883,605 | A * | 3/1999 | Knapp .................... | B60R 1/088 345/102 |
| 6,445,287 | B1 * | 9/2002 | Schofield ............ | B60C 23/0401 340/442 |

(Continued)

FOREIGN PATENT DOCUMENTS

| | | |
|---|---|---|
| JP | 2002-225629 A | 8/2002 |
| JP | 2005-335410 A | 12/2005 |

(Continued)

OTHER PUBLICATIONS

IP.com search report.*

*Primary Examiner* — Mohammad J Rahman
(74) *Attorney, Agent, or Firm* — ScienBiziP, P.C.

(57) ABSTRACT

A video processing unit generates a conversion video having the same angle of view as an angle of view of a mirror image by converting a camera video. The video processing unit causes the generated conversion video to be displayed in a display region such that the conversion video is superimposed on the mirror image.

13 Claims, 17 Drawing Sheets

(56) References Cited

U.S. PATENT DOCUMENTS

| | | | | |
|---|---|---|---|---|
| 8,339,526 | B2* | 12/2012 | Minikey, Jr. | B60R 1/12 349/11 |
| 9,333,900 | B2* | 5/2016 | Arai | B60R 1/1207 |
| 9,969,332 | B1* | 5/2018 | Pertsel | G06K 9/00825 |
| 10,449,902 | B1* | 10/2019 | Englander | B60R 1/00 |
| 10,479,202 | B2* | 11/2019 | Torii | B60Q 1/268 |
| 2002/0154007 | A1* | 10/2002 | Yang | B60R 11/0235 340/456 |
| 2003/0095182 | A1* | 5/2003 | Imoto | H04N 7/183 348/148 |
| 2008/0068520 | A1* | 3/2008 | Minikey, Jr. | B60R 1/12 349/11 |
| 2009/0079585 | A1* | 3/2009 | Chinomi | B60R 1/00 340/901 |
| 2010/0194596 | A1* | 8/2010 | Wang | B60R 1/00 340/936 |
| 2012/0320444 | A1* | 12/2012 | Baur | B32B 17/10174 359/267 |
| 2013/0229519 | A1* | 9/2013 | Kavuru | B60R 11/04 348/148 |
| 2014/0245225 | A1* | 8/2014 | Yagihashi | H04M 1/0214 715/810 |
| 2014/0300457 | A1* | 10/2014 | Geerlings | G07C 9/00896 340/438 |
| 2016/0159286 | A1* | 6/2016 | Harville | B60Q 1/503 340/438 |
| 2016/0257248 | A1* | 9/2016 | Lisseman | G08G 1/167 |
| 2016/0325678 | A1* | 11/2016 | Autran | B60R 1/00 |
| 2016/0355136 | A1* | 12/2016 | Kuo | G06K 9/00791 |
| 2016/0364111 | A1* | 12/2016 | Piekny | G06F 3/0488 |
| 2016/0365068 | A1* | 12/2016 | Sakaguchi | G09G 5/10 |
| 2016/0375833 | A1* | 12/2016 | Larson | B60R 1/12 348/148 |
| 2017/0034454 | A1 | 2/2017 | Sawada | |
| 2017/0221425 | A1* | 8/2017 | Lu | B60R 1/088 |
| 2017/0272702 | A1* | 9/2017 | Ozawa | B60R 1/025 |
| 2017/0297493 | A1* | 10/2017 | Gillespey | B60R 1/12 |
| 2017/0320435 | A1* | 11/2017 | Chung | B60R 1/00 |
| 2018/0222391 | A1* | 8/2018 | Chen | H04N 5/232933 |
| 2019/0258131 | A9* | 8/2019 | Lynam | G02F 1/153 |
| 2020/0018997 | A1* | 1/2020 | Weindorf | G02F 1/0136 |
| 2020/0059609 | A1* | 2/2020 | Tsutsumitake | G06T 3/4038 |

FOREIGN PATENT DOCUMENTS

| | | |
|---|---|---|
| JP | 2006-135797 A | 5/2006 |
| JP | 2011-030078 A | 2/2011 |
| JP | 2016-134657 A | 7/2016 |
| JP | 2017-034453 A | 2/2017 |
| JP | 2017-165211 A | 9/2017 |

* cited by examiner

REARVIEW DISPLAY DEVICE, REARVIEW DISPLAY METHOD, AND PROGRAM

BACKGROUND

1. Field

The present disclosure relates to a rearview display device, a rearview display method, and a program.

2. Description of the Related Art

In the related art, a rearview display device which is mounted on a vehicle or the like and includes both an optical mirror and an image sensor is known (for example, Japanese Unexamined Patent Application Publication No. 2017-165211). Since the rearview display device is mounted on the vehicle or the like, the safety needs to be improved.

In the related art, a method of detecting abnormality of a video is suggested as a technology of improving the safety of the rearview display device. For example, Japanese Unexamined Patent Application Publication No. 2011-030078 discloses an image display device for a vehicle including an image capturing unit that includes a plurality of cameras arranged so as to be distributed at a vehicle and is capable of capturing a periphery of the vehicle, an overhead-view image generation unit that generates an overhead-view image of the vehicle, a first image generation unit that generates background images of the vehicle by processing images captured by the plurality of cameras and outputs a first image acquired by combining the background images with the overhead-view image, a second image generation unit that forms an image acquired by rendering the first image symmetric with respect to a plane which is perpendicular to a traveling direction of the vehicle near the background images of the rear or front of the vehicle and is perpendicular to the ground as a reference and generates a second image which enables identifying of the image being symmetric with respect to the plane, an image composition unit that selectively combines the first image from the first image generation unit with the second image from the second image generation unit, and a display unit that is capable of displaying an output image from the image composition unit. Also disclosed in Japanese Unexamined Patent Application Publication No. 2011-030078 is that, according to the image display device for a vehicle, in a case where a mirror image is displayed, it is possible to separately display the mirror image and an actual video such that the mirror image is not mistakenly recognized as the actual video.

Japanese Unexamined Patent Application Publication No. 2016-134657 discloses a field-of-angle support device including a camera (110) that forms a captured image by capturing a periphery, an image processing unit (120) that forms a display image by performing predetermined image processing on the captured image, and a display unit (130) that displays the display image. The camera (110) adds a mark image indicating a normal operation to the captured image and outputs the captured image to the image processing unit (120). Also disclosed in Japanese Unexamined Patent Application Publication No. 2016-134657 is that, according to the field-of-view support device, a viewer can immediately recognize whether or not a failure occurs with a simple configuration.

In the technology of Japanese Unexamined Patent Application Publication No. 2011-030078, since gradation display is performed by changing a color density of the mirror image from a peripheral portion to a central portion step by step, the viewability of this portion is degraded. Since a gradation display position is a frame portion of the mirror image, viewing angles of the mirror image in an up-down direction and a left-right direction are narrowed.

In the technology of Japanese Unexamined Patent Application Publication No. 2016-134657, since the mark image indicating the normal operation is added to the captured image, a field of view of a region of a portion at which the mark image is displayed is disturbed. In a case where information (for example, following vehicle) to be cared for in driving is present in a region in which the field of view is disturbed, the driver continues to drive while the driver is not able to recognize the information. Thus, there is a concern that the driver accidentally drives the vehicle due to lack of recognition.

SUMMARY

The present disclosure has been made in view of such problems, and the present disclosure enables the driver to confirm whether or not abnormality occurs in a video without disturbing a field of view of the driver.

According to an aspect of the disclosure, there is provided a rearview display device including a display unit, a dimming mirror that is disposed so as to be overlapped with a display surface of the display unit, and reflects, as a mirror image, a periphery of a vehicle, an image capturing unit that generates a video by capturing the periphery of the vehicle, and a video processing unit that generates a conversion video having an angle of view identical with an angle of view of the mirror image by converting the video, and causes the display unit to display the conversion video such that the conversion video is superimposed on the mirror image.

According to another aspect of the disclosure, there is provided a rearview display device including a display unit, a dimming mirror that is disposed so as to be overlapped with a display surface of the display unit, and reflects, as a mirror image, a periphery of a vehicle, an image capturing unit that generates a video by capturing the periphery of the vehicle, and a video processing unit that converts the video to generate a conversion video in which a size of the video is reduced, and causes the conversion video and the mirror image to be separately displayed in a display region by causing the conversion video to be displayed in a first region of the display region of the display unit and causing a dark video to be displayed in a second region of the display region except for the first region.

According to still another aspect of the disclosure, there is provided a rearview display method performed by a rearview display device that includes a display unit, and a dimming mirror which is disposed so as to be overlapped with a display surface of the display unit and reflects, as a mirror image, a periphery of a vehicle. The method includes generating a video by capturing the periphery of the vehicle, and generating a conversion video having an angle of view identical with an angle of view of the mirror image by converting the video, and causing the display unit to display the conversion video such that the conversion video is superimposed on the mirror image.

According to another aspect of the disclosure, there is provided a rearview display method performed by a rearview display device that includes a display unit, and a dimming mirror which is disposed so as to be overlapped with a display surface of the display unit and reflects, as a mirror image, a periphery of a vehicle. The method includes generating a video by capturing the periphery of the vehicle, and converting the video to generate a conversion video in which a size of the video is reduced, and causing the conversion video and the mirror image to be separately displayed in a display region by causing the conversion video to be displayed in a first region of the display region of the display unit and causing a dark video to be displayed in a second region of the display region except for the first region.

According to another aspect of the disclosure, there is provided a program causing a computer to function as any one of the rearview display devices described above. The program causes the computer to function as the units.

DESCRIPTION OF THE EMBODIMENTS

First Embodiment

Configuration of Rearview Display Device 1

Figure 1A:
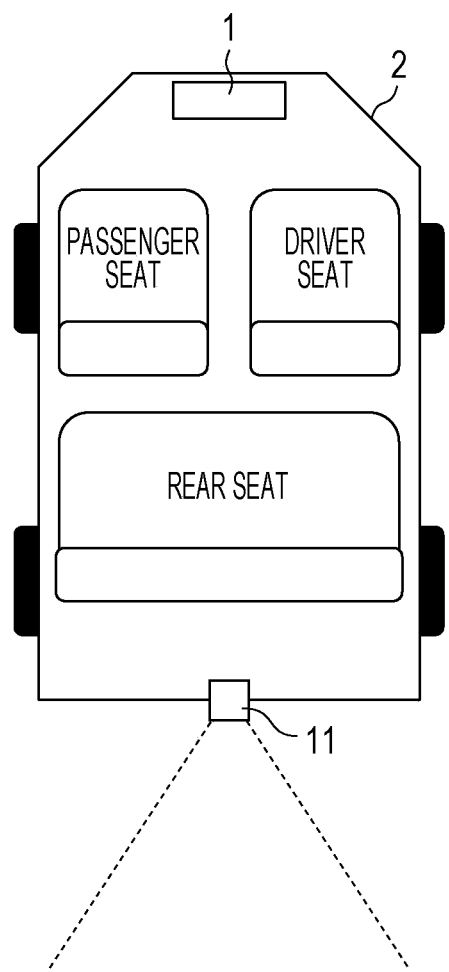
FIGS. 1A and 1B are diagrams showing an example of a vehicle on which a rearview display device according to a first embodiment of the present disclosure is mounted.
Figure 1B:
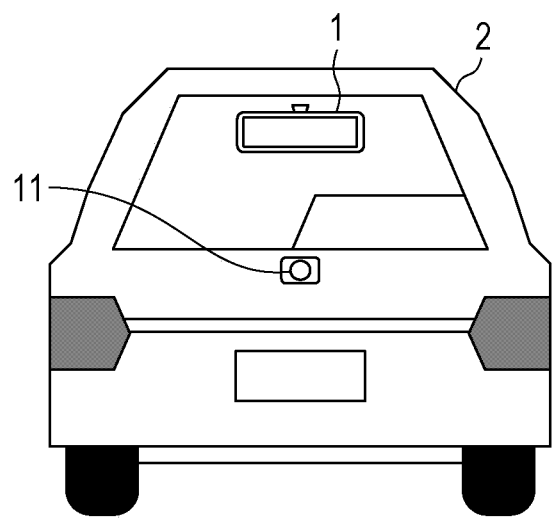

FIGS. 1A and 1B are diagrams showing an example of a vehicle 2 on which a rearview display device 1 according to a first embodiment of the present disclosure. FIG. 1A is a top view of the vehicle 2, and FIG. 1B is a rear view of the vehicle 2. As shown in FIGS. 1A and 1B, the rearview display device 1 is disposed within the vehicle 2, and an in-vehicle camera 11 (image capturing unit) is disposed at a central portion on a rear side of the vehicle 2. The in-vehicle camera 11 generates a camera video for showing the rear side by capturing the rear side of the vehicle 2. The rearview display device 1 presents the camera video to a driver by displaying the camera video. The driver can recognize the rear side of the vehicle 2 by viewing the camera video.

The configuration and arrangement of the rearview display device 1 and the in-vehicle camera 11 shown in FIGS. 1A and 1B are merely examples. For example, the in-vehicle camera 11 may be mounted at a location other than the central portion on the rear side of the vehicle 2.

Figure 2A:
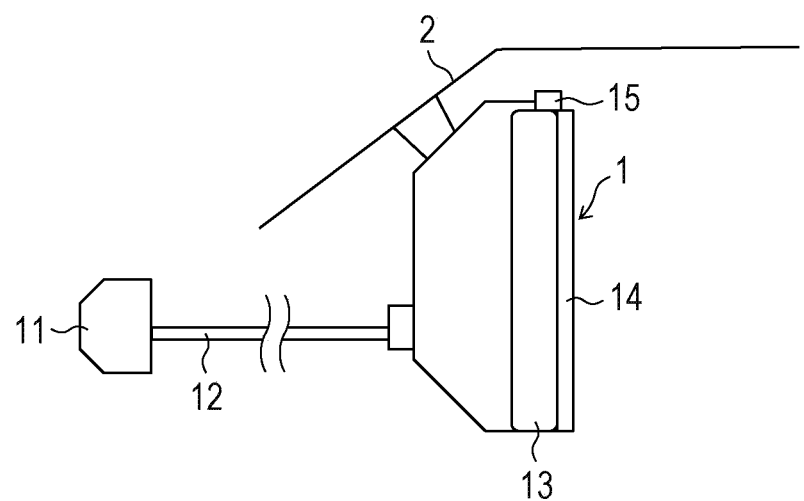
FIGS. 2A and 2B are diagrams showing an example of a detailed configuration of the rearview display device according to the first embodiment of the present disclosure.
Figure 2B:
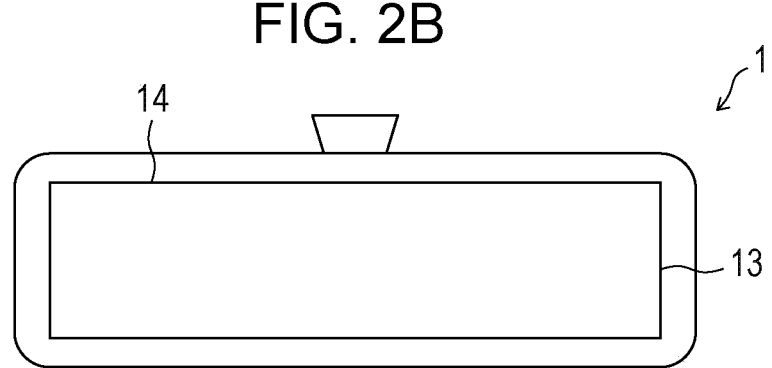

FIGS. 2A and 2B are diagrams showing an example of a detailed configuration of the rearview display device 1 according to the first embodiment of the present disclosure. FIG. 2A shows a side surface of the rearview display device 1, and FIG. 2B is a front surface of the rearview display device 1. As shown in FIGS. 2A and 2B, the rearview display device 1 includes the in-vehicle camera 11, a harness 12, a display 13, a dimming mirror 14, and an illuminance sensor 15. The harness 12 connects the in-vehicle camera 11 and the rearview display device 1 to each other. The display 13 displays various videos. The dimming mirror 14 can freely adjust a transmittance for incident light. The illuminance sensor 15 detects a brightness (illuminance) around the illuminance sensor 15.

In FIGS. 2A and 2B, the dimming mirror 14 is disposed so as to be overlapped with a display surface of the display 13 on the display surface side (front side) of the display 13. Accordingly, video light emitted from the display 13 reaches the eyes of the driver through the dimming mirror 14.

Figure 3:
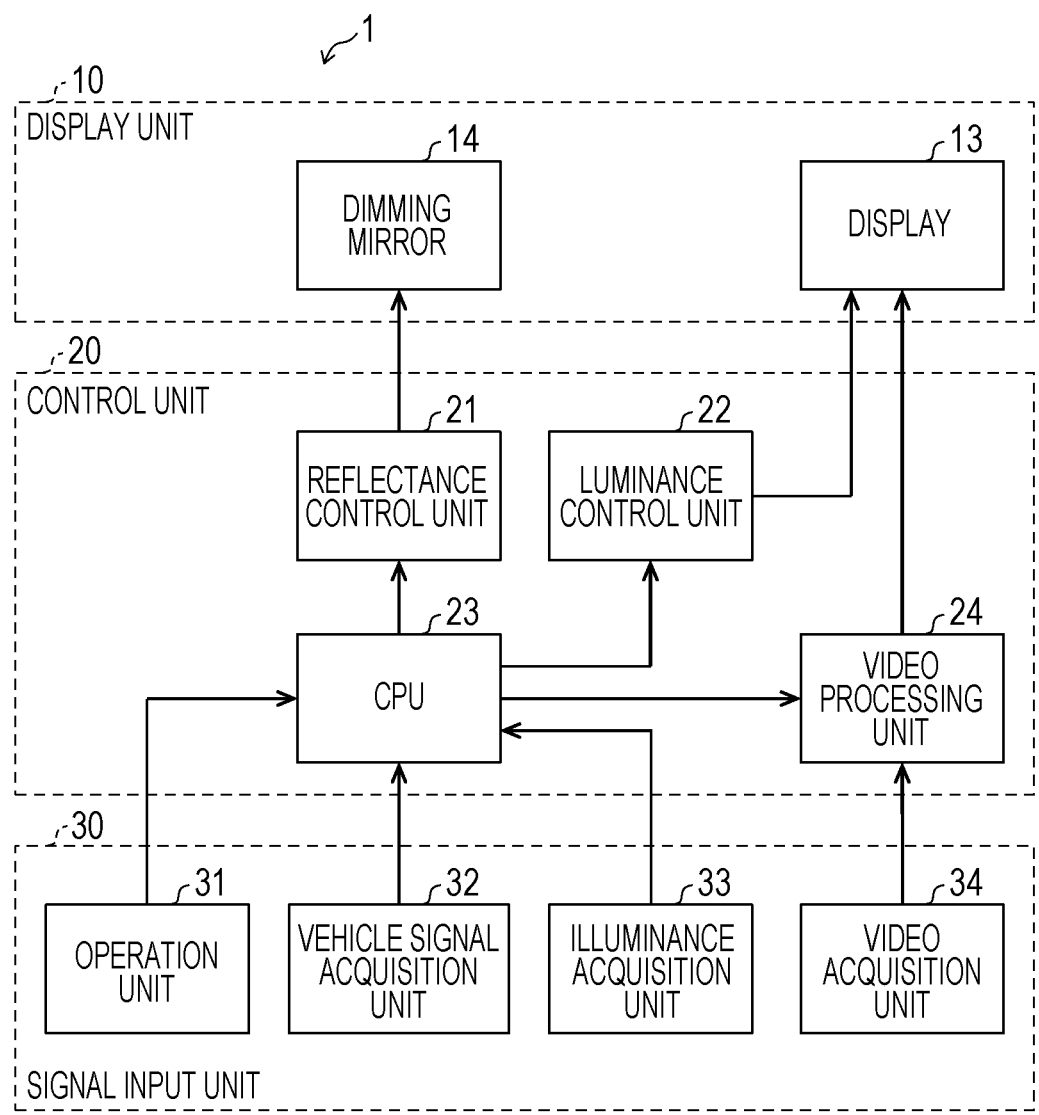
FIG. 3 is a block diagram showing an example of a principal configuration of the rearview display device according to the first embodiment of the present disclosure.

FIG. 3 is a block diagram showing an example of a principal configuration of the rearview display device 1 according to the first embodiment of the present disclosure. As shown in this diagram, the rearview display device 1 includes a display unit 10, a control unit 20, and a signal input unit 30. The display unit 10 includes the display 13 and the dimming mirror 14. The control unit 20 includes a reflectance control unit 21, a luminance control unit 22, a CPU 23 (determination unit), and a video processing unit 24. The signal input unit 30 includes an operation unit 31, a vehicle signal acquisition unit 32 (vehicle information acquisition unit), an illuminance acquisition unit 33, and a video acquisition unit 34. The display unit 10 presents various types of visual information including the video to the driver. The signal input unit 30 acquires various information and videos for use in the control of the rearview display device 1 and the display of the video. The control unit 20 controls the rearview display device 1 or displays the video on the display 13 by using the information and the video acquired by the signal input unit 30.

Vehicle Signal Acquisition Unit 32

The vehicle signal acquisition unit 32 acquires, as an electrical signal, various types of vehicle information indicating a state of the vehicle 2. Examples of the vehicle information include a dimmer signal, a hand brake signal, and vehicle speed information. The vehicle signal acquisition unit 32 can acquire any vehicle information regarding the vehicle 2 other than the aforementioned information. The vehicle signal acquisition unit 32 transmits the acquired vehicle signal to the CPU 23. The vehicle signal is transmitted from the vehicle 2 to the CPU 23 according to any transmission scheme. Examples of the transmission scheme include a controller area network (CAN). The CAN is an internal communication network protocol used as means for transmitting vehicle information such as a vehicle internal speed, engine speed, and a brake state. High-reliability communication can be performed through the information transmission using the CAN. The CAN is merely an example, and the vehicle signal acquisition unit 32 can transmit the vehicle signal to the CPU 23 according to any transmission scheme other than the CAN.

Illuminance Sensor 15 and Illuminance Acquisition Unit 33

The illuminance sensor 15 detects a surrounding illuminance of the illuminance sensor 15. The illuminance acquisition unit 33 acquires, as an electrical signal, the illuminance detected by the illuminance sensor 15 from the illuminance sensor 15, and transmits the acquired illuminance to the CPU. The transmission scheme may be any scheme. For example, the illuminance sensor 15 includes a photodiode or a phototransistor, and a peripheral circuit. The illuminance acquisition unit 33 acquires, as an electrical signal of an analog value or a digital value, the detected illuminance from the illuminance sensor 15. In a case where the illuminance acquisition unit 33 acquires the electrical signal of the analog value, the CPU 23 converts the electrical signal of the analog value into an electrical signal of a digital value. In a case where the illuminance acquisition unit 33 acquires the electrical signal of the digital value, the CPU 23 do not perform conversion to the electrical signal of the digital value.

The illuminance sensor 15 is installed at any position of the rearview display device 1 where the illuminance sensor 15 does not hinder the viewing of the driver. In a case where the installation position of the illuminance sensor 15 is different, the illuminance to be detected by the illuminance sensor 15 may be different. Thus, the installation position of the illuminance sensor 15 can be changed depending on a location at which illuminance is desired to be acquired. The illuminance sensor 15 may be installed on the outside of the rearview display device 1.

The rearview display device 1 may include a plurality of illuminance sensors 15. In a case where the plurality of illuminance sensors 15 is installed in the rearview display device 1, it is possible to detect illuminance of incident light in a wider range and various directions as compared to a case where one illuminance sensor 15 is installed. Accordingly, it is possible to further improve the reliability of the detected illuminance. The illuminance acquisition unit 33 can acquire an electrical signal indicating illuminance in a specific direction from any one of the plurality of illuminance sensors 15 depending on a situation.

In-Vehicle Camera 11 and Video Acquisition Unit 34

The in-vehicle camera 11 includes a lens unit that concentrates incident light, and an image sensor unit that converts light into an electrical signal. For example, the image sensor unit includes an image sensor such as a charge coupled device (CCD) type image sensor or a complementary metal oxide semiconductor (CMOS) type image sensor. The light concentrated by the lens unit is converted into the electrical signal by the image sensor unit. The video acquisition unit 34 acquires the camera video captured by the in-vehicle camera 11 from the in-vehicle camera 11, and transmits the acquired camera video to the video processing unit 24. The transmission scheme may be any scheme.

CPU 23

The CPU 23 incorporates a nonvolatile memory that retains program information constituted by a plurality of command groups, and executes the command group described by a program. Accordingly, the CPU 23 processes various types of data acquired by the signal input unit 30 or controls peripheral devices of the rearview display device 1. The CPU 23 has a function of inputting and outputting signals. For example, the CPU 23 controls the operations of the reflectance control unit 21 and the video processing unit 24 based on the signals input from the vehicle signal acquisition unit 32 and the illuminance acquisition unit 33.

Video Processing Unit 24

The video processing unit 24 generates a conversion video by processing the camera video acquired by the video acquisition unit 34. The video processing unit 24 further displays the generated conversion video on the display 13 by transmitting the generated convert video to the display 13. The transmission scheme may be any scheme. The video processing unit 24 has video processing functions such as edge enhancement, video luminance adjustment, gamma adjustment, and contrast adjustment. The CPU 23 can control these video processing functions of the video processing unit 24.

The video processing unit 24 aligns angles of view of a mirror image and the camera video with each other at the time of converting the camera video into the conversion video. It is assumed that the angle-of-view alignment mentioned herein indicates that a display region of the mirror image (virtual image) reflected in the dimming mirror 14 and a display region of the camera video match with each other. That is, the matching of the angles of view means that the camera video is converted such that a rear side region (hereinafter, referred to as the angle of view of the mirror image or the dimming mirror 14) which is reflected from the dimming mirror 14 and is seen by the driver and an image capturing region of the camera video match with each other.

The size of the display region of the mirror image and the size of the display region of the camera video may not necessarily match with each other. For example, in a case where the angle of view of the in-vehicle camera 11 and the angle of view of the dimming mirror 14 are different, the sizes of the display regions are different. Alternatively, the sizes of the display regions may be different depending on the installation position of the in-vehicle camera 11. The video processing unit 24 changes the sizes of the display regions such that the size of the display region of the camera video matches with the size of the display region of the mirror image. The video processing unit 24 apparently changes the angle of view of the in-vehicle camera 11 by enlarging or reducing the camera video. A case where the camera video is enlarged corresponds to a case where the angle of view of the in-vehicle camera 11 is narrowed. A case where the camera video is reduced corresponds to a case where the angle of view of the in-vehicle camera 11 is widened. For example, in a case where the angle of view of the in-vehicle camera 11 is greater than the angle of view of the dimming mirror 14, the angle of view of the in-vehicle camera 11 matches with the angle of view of the dimming mirror 14 by enlarging the camera video. An enlargement ratio is given by a ratio of the tangent of (angle of view of in-vehicle camera 11÷2) to the tangent of (angle of view of dimming mirror 14÷2).

In the first embodiment, the dimming mirror 14 is installed at a front part of the vehicle 2, and the in-vehicle camera 11 is installed at a rear part of the vehicle 2. Accordingly, in a case where the angle of view of the dimming mirror 14 is equal to the angle of view of the in-vehicle camera 11, the in-vehicle camera 11 is installed at a position closer to an image capturing target of the in-vehicle camera 11 than the dimming mirror 14. In this case, the size of the display region of the camera video is less than the size of the display region of the mirror image. Thus, the video processing unit 24 needs to correct a difference between the sizes of the display regions caused by the difference between the installation position of the dimming mirror 14 and the installation position of the in-vehicle camera 11.

In this case, since an image capturing range of the in-vehicle camera 11 is narrower than a field of view of the dimming mirror 14, the video processing unit 24 matches the display region of the camera video with the display region of the mirror image by reducing the camera video. A reduction ratio is given by a ratio of a distance from the in-vehicle camera 11 to the image capturing target to a distance from the dimming mirror 14 to the image capturing target. The video processing unit 24 can match the display region of the camera video with the display region of the mirror image by processing the camera video in this manner.

Dimming Mirror 14 and Reflectance Control Unit 21

The dimming mirror 14 is a device including an element capable of variably controlling the transmittance for the incident light. The dimming mirror 14 functions as a glass that transmits the light in a case where the transmittance is high, and functions as a plane mirror that reflects the light in a case where the transmittance is low. Desirably, the dimming mirror 14 is a gas chromic mirror glass or an electrochromic mirror film. The reflectance control unit 21 controls the transmittance of the dimming mirror 14 according to the luminance of the display 13.

The rearview display device 1 can include a half mirror instead of the dimming mirror 14. The half mirror refers to a plane mirror in which intensity of transmitted light and intensity of reflected light are substantially the same among plane mirrors that transmit a part of the incident light and reflect a part of the remaining light. In a case where the rearview display device 1 includes the half mirror, when the luminance of the display 13 becomes higher, dominant light reaching the eyes of the driver is light transmitted from the display 13. Accordingly, the video displayed on the display 13 is principally visible to the eyes of the driver. In contrast, when the luminance of the display 13 becomes lower, the dominant light is light reflected from the half mirror. Accordingly, the mirror image reflected in the half mirror is principally visible to the eyes of the driver. In a case where the rearview display device 1 includes the half mirror as stated above, the transmittance of the half mirror is not able to be changed. It is possible to switch between the display of the conversion video and the display of the mirror image by simply adjusting the luminance of the display 13. Accordingly, it is possible to further simplify the configuration of control software and a peripheral circuit mounted on the rearview display device 1.

The shape of the dimming mirror 14 may not be the shape of the plane mirror, and may be the shape of a convex mirror having curvature. The angle of view of the dimming mirror 14 having the shape of the convex mirror is wider than the angle of view of the dimming mirror 14 having the shape of the plane mirror. Accordingly, in a case where the rearview display device 1 includes the dimming mirror 14 having the shape of the convex mirror, it is possible to present the mirror image for showing a wider range on the rear side of the vehicle 2 to the driver.

Display 13 and Luminance Control Unit 22

The display 13 includes a light-emitting element, and functions to enable the driver to view the video. Examples of the display 13 include a liquid crystal display in which a liquid crystal display panel and a backlight are combined. Examples of a light-emitting element constituting the backlight include a light-emitting diode (LED). Other examples of the display 13 include an organic electroluminescence (EL) display. Since the organic EL display functions as both the display panel and the light-emitting element, the display 13 can be implemented as a single device. The luminance control unit 22 controls the luminance of the display 13 according to the luminance of the dimming mirror 14. The luminance control unit 22 controls the luminance of the display 13 according to, for example, a pulse-width modulation (PWM) signal.

Confirmation of Video Inversion

The rearview display device 1 can allow the driver to confirm whether or not the camera video is inverted by displaying the conversion video of which the angle of view is aligned with the angle of view of the mirror image on the display 13 such that the conversion video is superimposed on the mirror image. Hereinafter, an example of the confirmation method will be described with reference to FIGS. 4 and 5.

Figure 4:
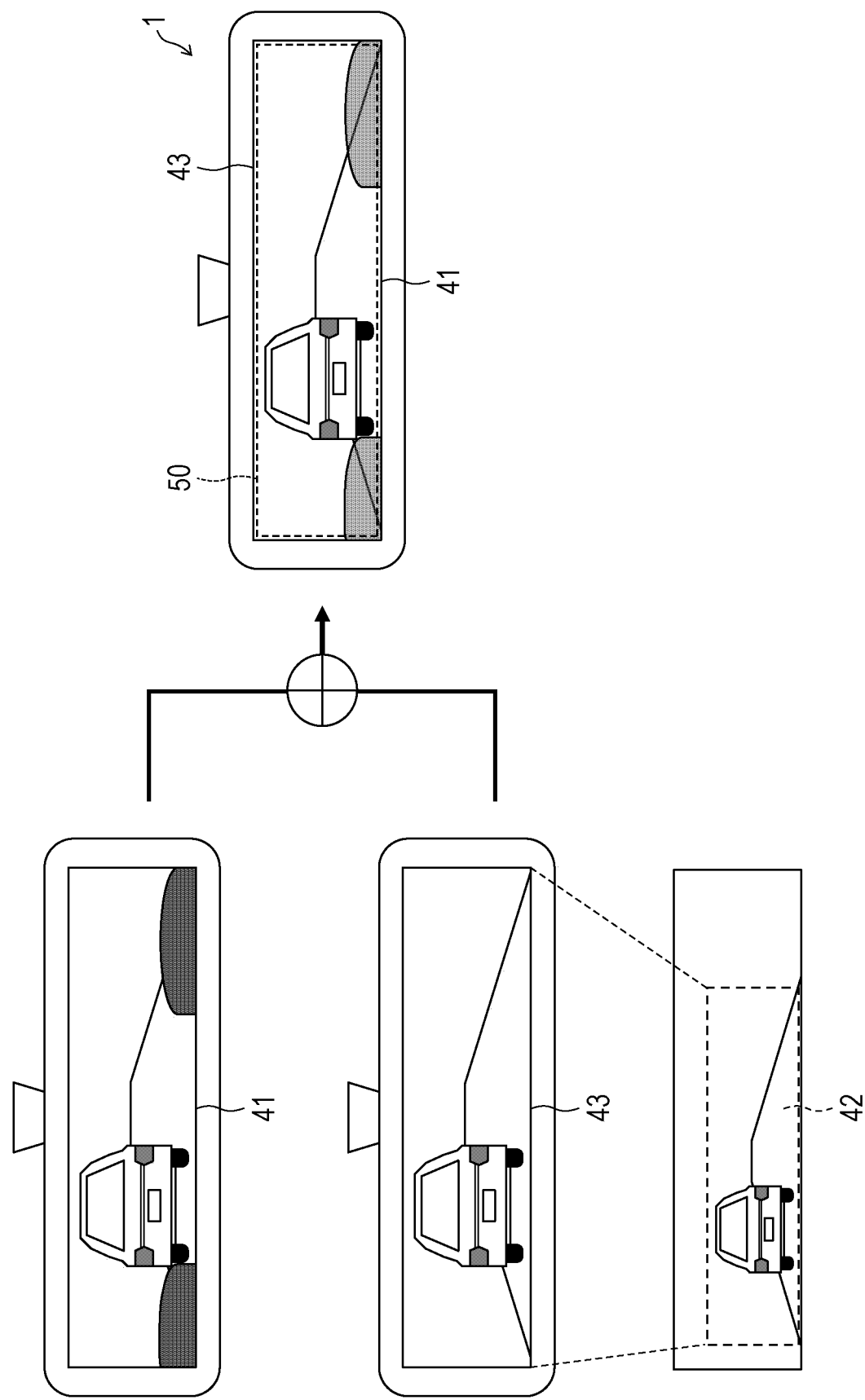
FIG. 4 is a diagram showing an example of superimposition display of a mirror image and a conversion video in the normal way in the first embodiment of the present disclosure.

FIG. 4 is a diagram showing an example of superimposition display of a mirror image 41 and a conversion video 43 in the normal way in the first embodiment of the present disclosure. In FIG. 4, the dimming mirror 14 shows, as the mirror image 41, the rear side of the vehicle 2. The in-vehicle camera 11 generates a camera video 42 indicating the rear side of the vehicle 2 by capturing the rear side of the vehicle 2. In FIG. 4, the camera video 42 is not inverted.

In a case where the mirror image 41 and the camera video 42 are displayed so as to be superimposed in a display region 50 of the rearview display device 1, it is desirable that the size of the camera video 42 matches with the size of the mirror image 41. Thus, the video processing unit 24 generates the conversion video 43 having the same angle of view as the angle of view of the mirror image 41 by converting the camera video 42. For example, the video processing unit 24 enlarges or reduces the camera video 42 or changes a cutout position of the conversion video 43 on the camera video 42 such that the angle of view of the mirror image 41 and the angle of view of the camera video 42 are aligned with each other.

The video processing unit 24 displays the generated conversion video 43 in the display region 50 such that the conversion video is superimposed on the mirror image 41. In FIG. 4, since the camera video 42 is not inverted, it seems to the driver that the mirror image 41 and the conversion video 43 are superimposed on each other in the display region 50. The driver recognizes that the camera video 42 is not horizontally inverted by confirming that the mirror image 41 and the conversion video 43 are superimposed.

Figure 5:
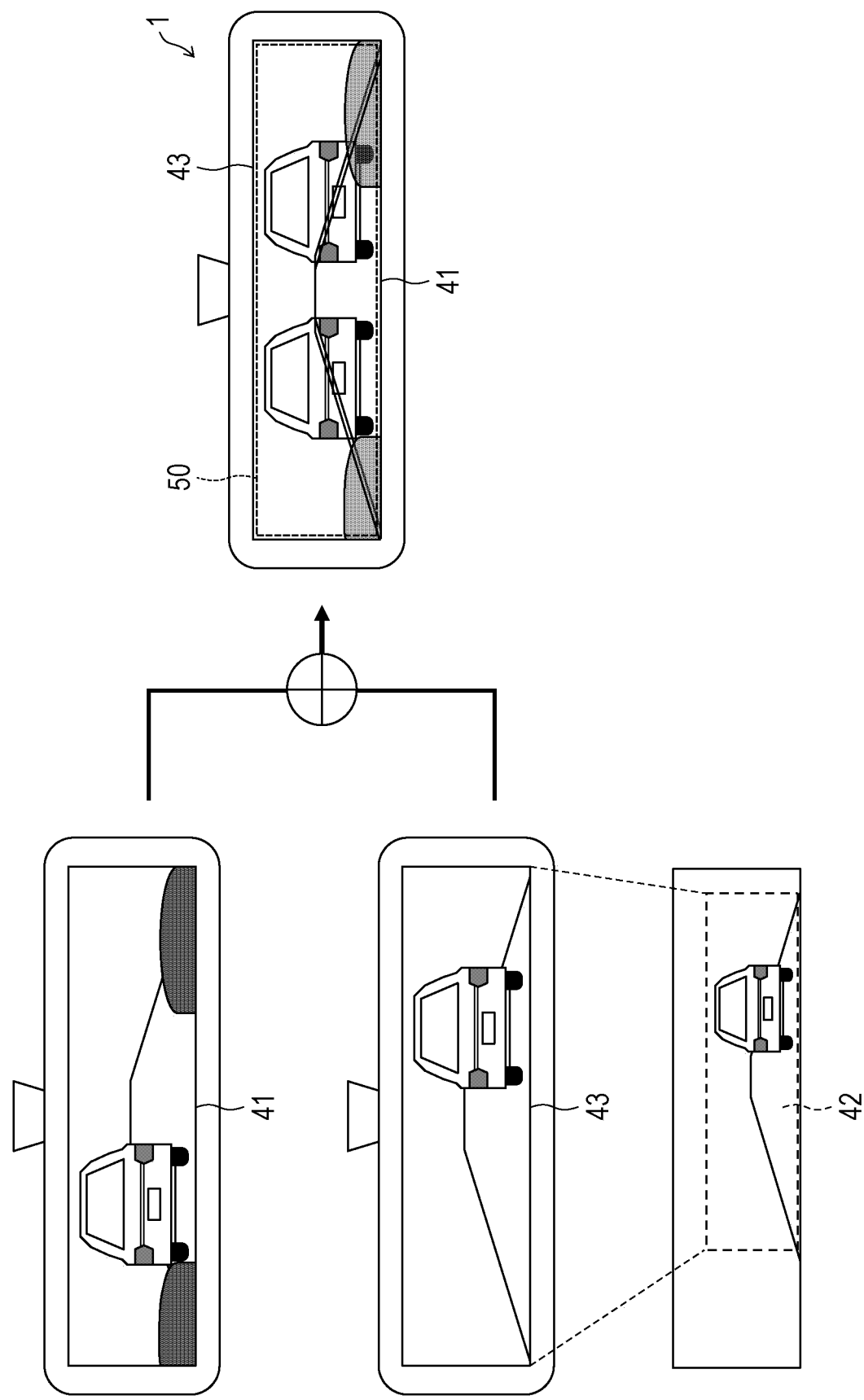
FIG. 5 is a diagram showing an example of superimposition display of the mirror image and the conversion video in a case where the camera video is horizontally inverted in the first embodiment of the present disclosure.

FIG. 5 is a diagram showing an example of superimposition display of the mirror image 41 and the conversion video 43 in a case where the camera video 42 is horizontally inverted in the first embodiment of the present disclosure. In FIG. 5, the camera video 42 is horizontally inverted. Accordingly, it seems to the driver that the mirror image 41 and the conversion video 43 are different from each other without being superimposed in the display region 50. The driver recognizes that the camera video 42 is horizontally inverted by confirming that the mirror image 41 and the conversion video 43 seem to be different from each other.

In a case where the mirror image 41 and the conversion video 43 are displayed so as to be superimposed in the display region 50, it is desirable that the luminance of the mirror image 41 and the luminance of the conversion video 43 are approximately the same. Thus, the reflectance control unit 21 controls the reflectance of the dimming mirror 14 and the luminance control unit 22 adjusts the luminance of the display 13 such that the luminance of the conversion video 43 and the luminance of the mirror image 41 to be recognized by the driver are equal at the time of the superimposition display.

Example of Process Flow

Figure 6:
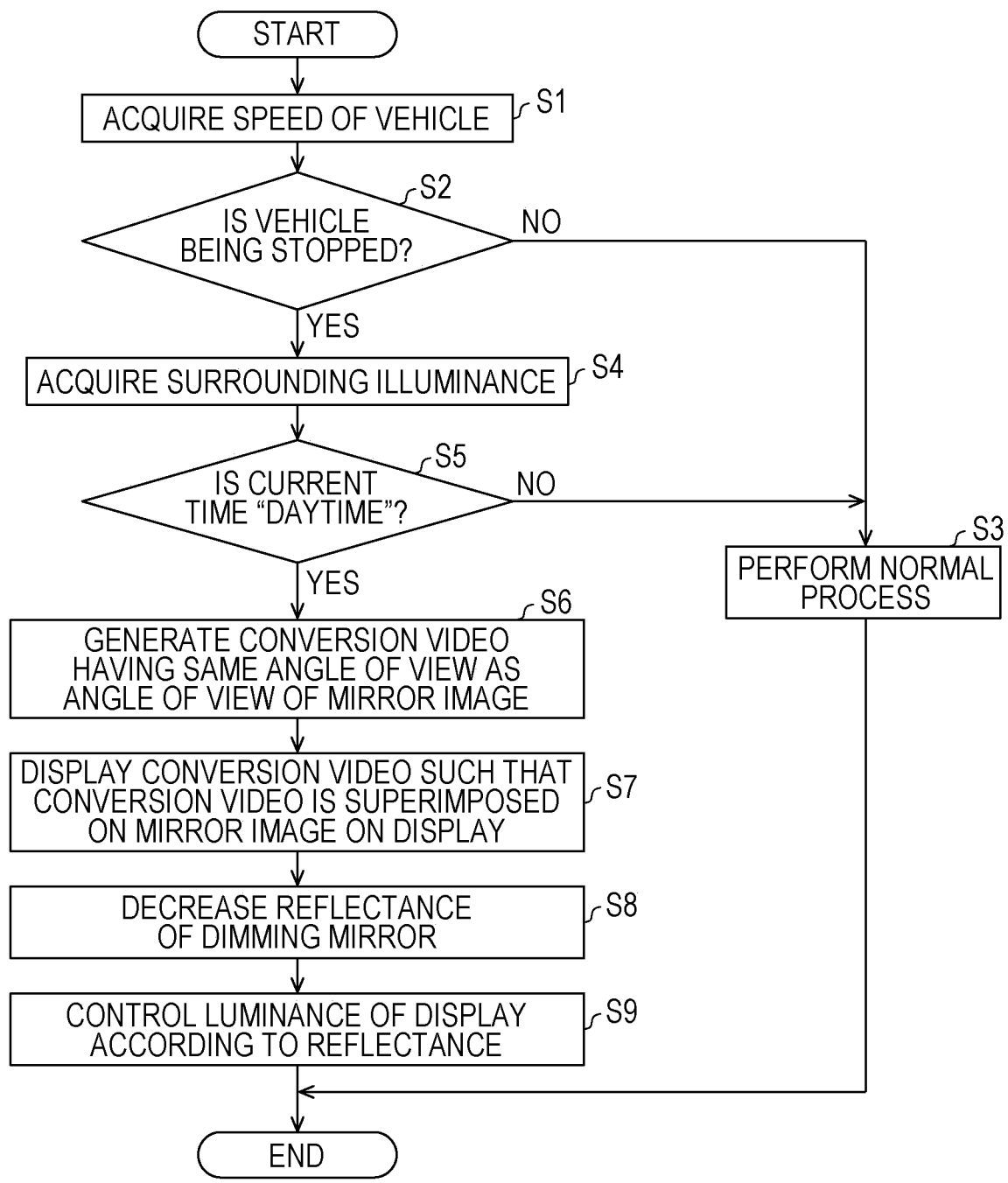
FIG. 6 is a flowchart showing a flow of a series of processes performed by the rearview display device according to the first embodiment of the present disclosure.

FIG. 6 is a flowchart showing a flow of a series of processes performed by the rearview display device 1 according to the first embodiment of the present disclosure.

In step S1, the vehicle signal acquisition unit 32 acquires a current speed of the vehicle 2. In step S2, the CPU 23 determines whether or not the vehicle 2 stops based on the vehicle speed acquired in step S1. In the case of "NO" in step S2, the rearview display device 1 performs a normal process in step S3. The normal process is to display the conversion video 43 without superimposing the conversion video on the mirror image 41 in the display region 50. Thereafter, the series of processes shown in FIG. 6 are ended. As a result, since the appearance the conversion video 43 to be displayed on the rearview display device 1 is not changed during the traveling of the vehicle 2, the driving of the driver is not disturbed. As will be described below, the rearview display device 1 allows the driver to confirm whether or not the video is inverted only in a case where the vehicle 2 stops such as a case where the vehicle 2 stops or the engine of the vehicle 2 starts based on a signal command.

In the case of "YES" in step S2, the illuminance acquisition unit 33 acquires a current surrounding illuminance detected by the illuminance sensor 15 in step S4. There is a possibility that low-reliability data is to be mixed with the acquired illuminance due to the influence such as noise. It is preferable that the illuminance acquisition unit 33 smoothes the acquired illuminance by using a digital filter in order to acquire a stable illuminance. Examples of the digital filter include a finite impulse response (FIR) filter.

In step S5, the CPU 23 determines whether or not the current time is "daytime" based on the illuminance acquired in step S4. A case where the illuminance is equal to or greater than a threshold value is defined as "daytime", and a case where the illuminance is less than the threshold value is defined as "nighttime". The threshold value is set, as a fixed parameter, for the rearview display device 1 in advance. The driver can set the threshold value for the rearview display device 1. The CPU 23 determines that the current times is "daytime" in a case where the illuminance is equal to or greater than the threshold value, and determines that the current time is "nighttime" in a case where the illuminance is less than the threshold value.

In the case of "NO" in step S5, the rearview display device 1 performs the normal process in step S3. Thereafter, the series of processes shown in FIG. 6 are ended. As stated above, since there is a possibility that the driver is to have a difficulty in viewing the dimming mirror 14 in the nighttime, the rearview display device 1 does not allow the driver to confirm whether or not the video is inverted.

In the case of "YES" in step S5, the video processing unit 24 generates the conversion video 43 having the same angle of view as the angle of view of the mirror image 41 by converting the camera video 42 in step S6. In step S7, the video processing unit 24 displays the generated conversion video 43 in the display region 50. In step S8, the reflectance control unit 21 decreases the reflectance of the dimming mirror 14. In step S9, the luminance control unit 22 controls the luminance of the display 13 according to the reflectance of the dimming mirror 14. The rearview display device 1 controls the reflectance of the dimming mirror 14 and the luminance of the display 13 such that the luminance of the mirror image 41 reflected in the dimming mirror 14 and the luminance of the display 13 displaying the conversion video 43 match with each other by performing the processes of steps S8 and S9. Through these processes, the driver can clearly view both the mirror image 41 and the conversion video 43. Accordingly, in a case where it seems to the driver that the mirror image 41 and the conversion video 43 are superimposed, the driver can confirm that the conversion video 43 is not inverted. In contrast, in a case where it seems to the driver that the mirror image 41 and the conversion video 43 are different, the driver can confirm that the conversion video 43 is not inverted.

The reflectance control unit 21 may instantaneously switch the reflectance of the dimming mirror 14 or may switch the reflectance of the dimming mirror step by step for a predetermined switching time. The luminance control unit 22 may instantaneously switch the luminance of the display 13, or may switch the luminance of the display step by step for a predetermined switching time. In a case where the reflectance and the luminance are switched step by step, the driver can easily recognize a change of the video. The switching time is set, as a fixed parameter, for the rearview display device 1 in advance. The driver can set the switching time for the rearview display device 1. In this case, the driver can set a switching time for which the driver easily recognizes the change of the video for the rearview display device 1. Accordingly, it is possible to reduce individual differences in easiness of recognition for each driver.

Another Example of Process Flow

Figure 7:
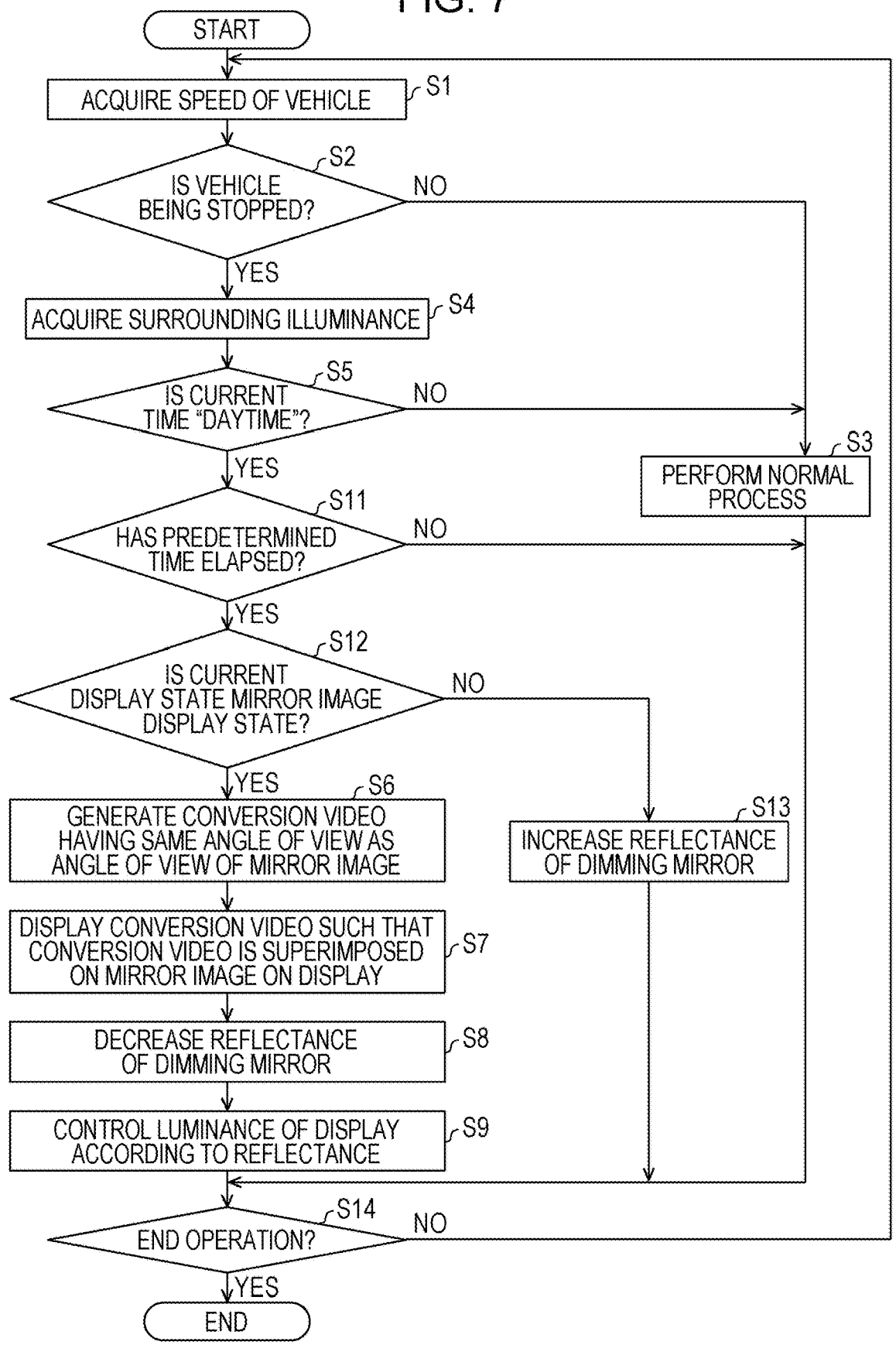
FIG. 7 is a flowchart for describing a flow of a series of processes performed by the rearview display device according to the first embodiment of the present disclosure.

FIG. 7 is a flowchart for describing a flow of a series of processes performed by the rearview display device 1 according to the first embodiment of the present disclosure. In a case where the series of processes shown in FIG. 7 is performed, the rearview display device 1 switches between the display of the mirror image 41 and the display of the conversion video 43 for the driver for each predetermined time instead of displaying the conversion video 43 such that the conversion video is superimposed on the mirror image 41 in the display region 50. In other words, the video processing unit 24 switches between the display of the mirror image 41 in the display region 50 and the display of the conversion video 43 in the display region 50 for each predetermined time. The video processing unit may switch between the display of the mirror image 41 for the driver and the superimposition display of the mirror image 41 and the conversion video 43 for each predetermined time. The video processing unit may switch between the display of the conversion video 43 for the driver and the superimposition display of the mirror image 41 and the conversion video 43 for each predetermined time. That is, in order to display a difference between the mirror image 41 and the conversion video 43 in an easy-to-understand manner, the video processing unit may switch between at least two of the display of the mirror image 41, the display of the conversion video 43, and the superimposition display of the mirror image 41 and the conversion video 43 for each predetermined time.

Since the processes of steps S1 to S9 among the processes shown in FIG. 7 are the same as the processes shown in FIG. 6, the detailed description will be omitted. After the processes of FIG. 7 is started, the CPU 23 starts to measure the time. In the case of "YES" in step S5, the CPU 23 determines whether or not a predetermined time elapses after the measurement of the time is started in step S11. In the case of "NO" in step S11, the rearview display device 1 advances the process of step S14 without performing any process. In the case of "YES" in step S11, the CPU 23 resets a measurement time, and then performs the process of step S12. As stated above, the rearview display device 1 can perform the processes of step S12 and subsequent steps whenever a predetermined time elapses.

In step S12, the reflectance control unit 21 acquires the current reflectance of the dimming mirror 14, and determines whether or not a current state in the display region of the rearview display device 1 is a mirror image display state based on the reflectance. A case where the reflectance of the dimming mirror 14 is a high reflection state is defined as a mirror image display state, and a case where the reflectance of the dimming mirror 14 is a low reflection state is defined as a conversion video display state. The mirror image display state is a state in which only the mirror image 41 is displayed in the display region of the rearview display device 1, that is, a state in which only the mirror image 41 is presented to the eyes of the driver. The conversion video display state is a state in which only the conversion video 43 is displayed in the display region of the rearview display device 1, that is, a state in which only the conversion video 43 is presented to the eyes of the driver.

In the case of "YES" in step S12, the rearview display device 1 performs the processes of steps S6 to S9. In this case, the rearview display device 1 needs not display the conversion video 43 in the display region 50 such that the conversion video is superimposed on the mirror image 41. For example, the reflectance control unit 21 can decrease the reflectance of the dimming mirror 14 such that only the conversion video 43 is viewed by the driver in step S8.

In the case of "NO" in step S12, the reflectance control unit 21 increases the reflectance of the dimming mirror 14 such that the light of the mirror image 41 is stronger than the light of the conversion video 43 in step S13. Accordingly, only the mirror image 41 is displayed in the display region 50 of the rearview display device 1. In other words, only the mirror image 41 of the mirror image 41 and the conversion video 43 is viewed by the eyes of the driver. In a case where the rearview display device 1 includes the half mirror instead of the dimming mirror 14, the luminance control unit 22 may turn off the display 13 in step S12. Accordingly, since the light of the conversion video 43 from the display 13 does not enter the half mirror, the driver views only the reflected light of the half mirror. Accordingly, it is possible to display only the mirror image 41 in the display region 50 of the rearview display device 1.

After step S3, step S9, or step S13, the rearview display device 1 determines whether or not to end the operation in step S14. In the case of "NO" in step S14, the rearview display device 1 returns the process to the process of the step S1. In the case of "YES" in step S14, the rearview display device 1 ends the operation.

As described above, the rearview display device 1 according to the present embodiment displays the conversion video 43 in the display region 50 such that the conversion video is superimposed on the mirror image 41. The driver can confirm whether or not abnormality such as the horizontal inversion of the conversion video 43 occurs depending on whether or not it seems that the mirror image 41 and the conversion video 43 are correctly superimposed. As stated above, the rearview display device 1 can allow the driver to confirm whether or not the abnormality of the conversion video 43 occurs without disturbing a field of view of the driver.

In a case where it is determined that the vehicle 2 does not stop (travels), the rearview display device 1 displays the conversion video 43 in the display region 50 without superimposing on the mirror image 41. The mirror image 41 may be displayed in the display region 50 instead of the conversion video 43. The camera video 42 acquired by the video acquisition unit 34 may be displayed in the display region 50 instead of the conversion video 43.

Meanwhile, in a case where it is determined that the vehicle 2 stops, the rearview display device 1 displays the conversion video 43 in the display region 50 such that the conversion video is superimposed on the mirror image 41. Accordingly, since the driver needs not confirm whether or not the abnormality of the conversion video 43 occurs during the traveling of the vehicle 2, it is possible to secure the safety of the driver.

Relationship Between Reflectance and Luminance

Figure 8:
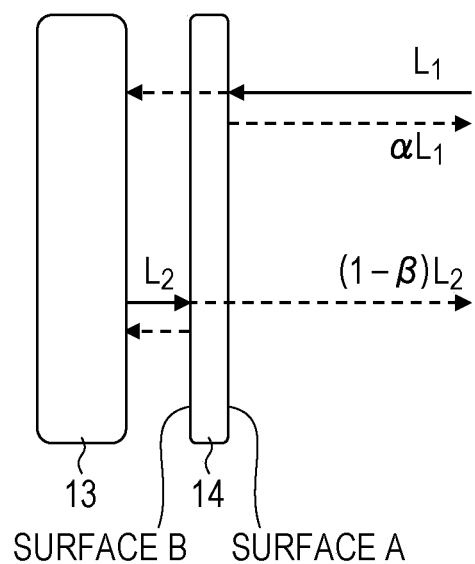
FIG. 8 is a diagram showing a model for describing an optimum relationship between the luminance of the mirror image and the luminance of the conversion video in a case where the conversion video is displayed so as to be superimposed on the mirror image in the first embodiment of the present disclosure.

FIG. 8 is a diagram showing a model for describing an optimum relationship between the luminance of the mirror image 41 and the luminance of the conversion video 43 in a case where the conversion video 43 is displayed so as to be superimposed on the mirror image 41 in the first embodiment of the present disclosure. In FIG. 8, a surface of two surfaces included in the dimming mirror 14 which is closer to the driver is defined as an A surface, and a surface which is closer to the display 13 is defined as a B surface. It is assumed that the reflectance on the A surface of the dimming mirror 14 is $\alpha$, the reflectance on the B surface is $\beta$, the surrounding luminance of the dimming mirror 14 is $L_1$, and the luminance of the conversion video 43 is $L_2$. In this case, the luminance of the mirror image 41 is $\alpha L_1$, and the luminance in a case where the light of the conversion video 43 output from the display 13 passes through the dimming mirror 14 is $(1-\beta)L_2$.

In a case where these two luminances are equal, the following restriction is established between the reflectances α and β of the dimming mirror 14 and the luminance $L_2$ of the conversion video 43.

$$L_1 \div L_2 = (1-\beta) \div \alpha \quad (1)$$

In a case where the reflectance a on the A surface of the dimming mirror 14 is equal to the reflectance 3 on the B surface, the following restriction is established.

$$L_1 \div L_2 = (1-\alpha) + \alpha \quad (2)$$

Here, it is assumed that the following two assumptions are prepared. Initially, it is assumed that all the reflected light is specularly reflected on the A surface and the B surface of the dimming mirror 14. The light reflection on the surface of the display 13 and the light reflection between the A surface and the B surface of the dimming mirror 14 are ignored due to less influence on the driver.

The rearview display device 1 adjusts at least any of the luminance of the display 13 and the reflectance of the dimming mirror 14 such that Expression (1) described above is established. For example, the rearview display device 1 fixes the luminance of the display 13, and matches the luminance $L_1$ of the mirror image 41 with the luminance $L_2$ of the conversion video 43 by changing the reflectance of the dimming mirror 14. The rearview display device 1 may fix the reflectance of the dimming mirror 14 and adjust the luminance of the display 13. Alternatively, the rearview display device 1 may adjust both the luminance of the display 13 and the reflectance of the dimming mirror 14. In a case where the half mirror is used instead of the dimming mirror 14, the rearview display device 1 establishes Expression (1) described above by adjusting the luminance of the display 13. Such adjustment is performed, and thus, it is possible to improve the viewability of the driver.

The luminance $L_2$ of the conversion video 43 is determined depending on both the luminance of the display 13 and a luminance value of each pixel of the conversion video 43 displayed in the display region 50. Various values may be acquired, as the luminance value of each pixel, for each pixel, but the luminance of the display 13 is uniform for all the pixels. Accordingly, Expression (1) described above may not be established for all the pixels. For example, the rearview display device 1 adjusts the luminance of the display 13 such that the luminance value of the pixel corresponding to a peak value of a histogram satisfies Expression (1) described above.

The rearview display device 1 may adjust contrast, dynamic range, and color in addition to the adjustment of the luminance. Accordingly, an effect of further matching the appearances of the videos of the mirror image 41 and the conversion video 43 is acquired as compared to a case where only the luminance adjustment is performed.

The rearview display device 1 may limit a region of the display region 50 in which the adjustment is performed. The adjustment is performed by narrowing a specific region in the display region 50, and thus, the resolution of the in-vehicle camera 11 approaches the resolution of the dimming mirror 14. As a result, the effect of further matching the appearances of the videos of the mirror image 41 and the conversion video 43 is acquired.

The rearview display device 1 can include a partially driven LED backlight. In this case, a plurality of LED backlights capable of being individually controlled are installed in the rearview display device 1. Accordingly, the rearview display device 1 locally adjusts the luminance of the display 13 by controlling any LED backlight. Thus, when the same number of LED backlights as the number of pixels of the display 13 are installed in the rearview display device 1, the rearview display device 1 can adjust the luminances of all the pixels to a luminance satisfying Expression (1) described above. Accordingly, it is possible to further enhance the effect of matching the appearances of the videos of the mirror image 41 and the conversion video 43.

Enhancement Using Video Processing

The video processing unit 24 performs various types of video processing such as edge enhancement, brightness enhancement, or contrast enhancement on the conversion video 43. Since the viewability for the conversion video 43 is improved through these video processing, the driver more easily confirms whether or not the video is inverted. The video processing unit 24 can locally perform the video processing on only a portion of the conversion video 43 of interest by using an object detection method. Accordingly, the driver can more easily know a portion of the conversion video 43 to be confirmed. It is desirable that an enhancement portion within the conversion video 43 is a bilaterally asymmetrical portion on the conversion video 43. Accordingly, the driver can more easily recognize that the conversion video 43 is inverted. Examples of the bilaterally asymmetrical portion include signs or characters on a road surface.

It is preferable that the video processing unit 24 displays a graphical user interface (GUI) such that the GUI is superimposed on the conversion video 43 in the display region 50. Accordingly, it is possible to clearly show a portion of the conversion video 43 at which the driver needs to gaze to the driver. In a case where character information or bounding boxes are presented to the driver by using the GUI, the driver can more easily know the portion of the conversion video 43 at which the driver needs to gaze.

It is preferable that the video processing unit 24 displays a message indicating that "display for the video inversion confirmation is currently performed" such that this message is superimposed on the conversion video 43 in the display region 50 at the time of displaying the conversion video 43 for the video inversion confirmation in the display region 50. For example, the video processing unit 24 displays, as a part of the GUI, such a message in the display region 50. In a case where the driver does not have prior knowledge regarding the video inversion confirmation, even though the conversion video 43 for the inversion confirmation is displayed in the display region 50 without such a message, there is a concern that an event occurring in the display region 50 is not able to be correctly understood. In a case where a message for notifying the driver that the display for the video inversion confirmation is performed is displayed in the display region 50, the driver can understand at a glance that the current display of the conversion video 43 is the display for the video inversion confirmation.

In a case where the driver does not gaze at the rearview display device 1 during the display of the conversion video 43 for the video inversion confirmation, there is a concern that the driver is unaware that the conversion video is inverted even though the conversion video 43 is inverted. Thus, it is preferable that the rearview display device 1 prompts the driver to confirm during the display of the conversion video 43 for the inversion confirmation. For example, the rearview display device 1 outputs sound for prompting the driver to confirm through an acoustic device such as a speaker. Even in a case where the driver does not gaze at the rearview display device 1, it is possible to prompt the driver to confirm the video inversion through the sound by using the acoustic device. The video processing unit 24 can prompt the driver to confirm by turning on and off the display 13. In this case, since it is possible to prompt the driver to confirm without newly adding a device to the rearview display device 1, it is possible to suppress the manufacturing cost of the rearview display device 1.

Parameter Adjustment for Angle-of-View Alignment

In a case where the mirror image 41 and the conversion video 43 are displayed so as to be superimposed, in order to match the appearances of the mirror image 41 and the conversion video 43, viewpoint position coordinates of the driver, a size of the dimming mirror 14, a unit normal vector of the display surface of the display 13, and a distance between the in-vehicle camera 11 and an angle-of-view alignment target surface need to be known. In the first embodiment, the rearview display device 1 retains, as fixed parameters, the aforementioned information in advance. The driver can set these parameters for the rearview display device 1. There are individual differences in the viewpoint position coordinates of the driver depending on a height and a sitting height of the driver, and a position setting of a driver seat and a tilt setting of a backrest in the vehicle 2. An optimum value of a tilt of the dimming mirror 14 is also different for each driver. Thus, it is possible to reduce the individual differences for each driver by changing these parameters in the rearview display device 1.

It is preferable that the rearview display device 1 stores each parameter set by the driver in a nonvolatile memory. Accordingly, since the driver needs not set the parameter again whenever the rearview display device 1 is activated, the time and effort of the driver are saved. The rearview display device 1 can store a plurality of different values for each parameter. In this case, even though different drivers board the same vehicle 2, the rearview display device 1 can use the optimum parameter value for each driver.

As the distance between the in-vehicle camera 11 and the angle-of-view alignment target surface is stored, a distance (for example, 5 m) at which the sizes of the following vehicle included in the mirror image 41 and the conversion video 43 can match with each other is stored, as a fixed value in advance in the rearview display device 1. A target for which the sizes in the mirror image 41 and the conversion video 43 match with each other is not limited to the following vehicle, and may be, for example, infinity. The driver can change a value of the distance set for the rearview display device 1 through calibration.

In a case where the field of view of the dimming mirror 14 is wider than the image capturing range of the in-vehicle camera 11, the region of the conversion video 43 corresponding to the field of view of the dimming mirror 14 may not be present during the superimposition display. The same is true of a case where the field of view of the dimming mirror 14 and the image capturing range of the in-vehicle camera 11 are shifted. It is preferable that the video processing unit 24 sets any pixel value such as (R, G, B)=(0, 0, 0) for the region that is not present. The pixel value may be any value which does not disturb the field of view of the driver.

Display Timing for Video Inversion Confirmation

The rearview display device 1 may not perform the superimposition display for the inversion confirmation whenever the vehicle 2 stops. For example, the rearview display device 1 performs the superimposition display of the conversion video 43 for once three times when the vehicle 2 stops, and performs normal display of the conversion video 43 for the two times. The normal display is to display only the conversion video 43 alone without superimposing the conversion video on the mirror image 41. In a case where the driver confirms whether the video is inverted whenever the vehicle 2 stops, since the driver feels the burden, there is a concern that the comfortable driving of the vehicle 2 is disturbed. In a case where the number of times the driver confirms whether or not the video is inverted, it is possible to reduce the burden of the driver. The driver can set the number of times of the superimposition display for the inversion confirmation for the rearview display device 1. Accordingly, each driver can confirm whether or not the video is inverted by the optimum number of times for each driver.

The rearview display device 1 can change the number of times of the superimposition display for the inversion confirmation depending on a total boarding time from a driving start point of time of the vehicle 2. For example, the rearview display device 1 reduces the number of times of the superimposition display as the total boarding time from the driving start point of time increases. Accordingly, it is possible to gradually reduce the burden of the driver as a driving time becomes longer.

In a case where there is the vehicle 2 under an environment in which there is a high possibility that a failure is to occur in the vehicle 2, it is preferable that the rearview display device 1 increases the number of times of the superimposition display for the inversion confirmation. Accordingly, in a case where the failure occurs in the vehicle 2, the driver can be aware that the failure occurs in the vehicle. The rearview display device 1 includes, for example, an acceleration sensor, and in a case where the acceleration sensor detects that the vehicle 2 is strongly impacted, the rearview display device increases the number of times of the superimposition display for a predetermined time after the detection. The rearview display device 1 includes, for example, a temperature sensor, and increases the number of times of the superimposition display in a case where a temperature is considerably high or is considerably low. The rearview display device 1 includes, for example, a humidity sensor, and increases the number of times of the superimposition display in a case where the humidity detected using the humidity sensor is considerably high or is considerably low.

Second Embodiment

In the first embodiment, since the surroundings of the driver is bright or the headlights of the following vehicle are illuminated to the driver, there is a possibility that the driver is to have a difficulty in seeing the mirror image 41 and the conversion video 43 displayed so as to be superimposed. Thus, a rearview display device 1 according to a second embodiment cancels the superimposition of the mirror image 41 and the conversion video 43 by separately displaying the mirror image 41 and the conversion video 43 in the display region 50 of the rearview display device 1. Accordingly, since it is possible to improve the visibility of the mirror image 41 and the conversion video 43 to the maximum, the driver can easily confirm that the conversion video 43 is correctly displayed.

Two-Separation Display in Up-Down Direction

Figure 9:
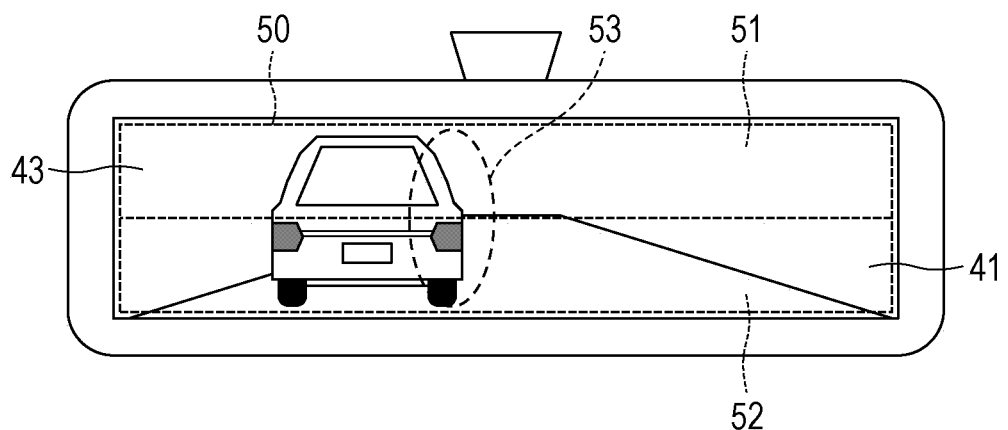
FIG. 9 is a diagram showing an example in which a rearview display device according to a second embodiment of the present disclosure separately displays the mirror image and the conversion video in two regions in an up-down direction of a display region.

FIG. 9 is a diagram showing an example in which the rearview display device 1 according to the second embodiment of the present disclosure separately displays the mirror image 41 and the conversion video 43 in two regions in an up-down direction of the display region 50. In the present embodiment, video conversion processing for generating the conversion video 43 having the same angle of view as the angle of view of the mirror image 41 is the same as the processing in the first embodiment, and thus, the detailed description will be omitted. In the example of FIG. 9, the video processing unit 24 further converts a lower half of the generated conversion video 43 into a dark video (for example, black video). The video processing unit 24 displays the conversion video 43 of which the lower half is converted into the dark video such that the conversion video is superimposed on the mirror image 41 in the display region 50. In this case, the luminance control unit 22 sufficiently increases the luminance of the display 13.

Accordingly, the light of the conversion video 43 output from the display 13 is stronger than the light of the mirror image 41 reflected from the dimming mirror 14 in an upper region 51 corresponding to an upper half (part) of the display region 50 of the rearview display device 1. Accordingly, as shown in FIG. 9, the mirror image 41 is not displayed and only the conversion video 43 is displayed in the upper region 51. Meanwhile, the light of the mirror image 41 is stronger than the light of the dark video as the lower half of the conversion video 43 in a lower region 52 corresponding to the lower half of the display region 50. Accordingly, as shown in FIG. 9, the conversion video 43 is not displayed and only the mirror image 41 is displayed in the lower region 52.

In a case where the mirror image 41 and the conversion video 43 are displayed in the display region 50, it is desirable that the luminance of the mirror image 41 and the luminance of the conversion video 43 are substantially equal. Thus, the reflectance control unit 21 controls the reflectance of the dimming mirror 14 and the luminance control unit 22 adjusts the luminance of the display 13 such that the luminance of the mirror image 41 and the luminance of the conversion video 43 recognized by the driver are equal. As a result, since the luminance of the mirror image 41 and the luminance of the conversion video 43 are the same luminance, the uncomfortable feeling of the driver due to the separation display is reduced, and the viewability of the driver can be secured.

The rearview display device 1 may adjust contrast, dynamic range, color, and resolution in addition to the adjustment of the luminance. Accordingly, since the appearances of the mirror image 41 and the conversion video 43 can be further matched than in a case where only the luminance adjustment is performed, the uncomfortable feeling of the driver due to the separation display is reduced, and the viewability of the driver can be improved.

The rearview display device 1 may limit a region of the display region 50 in which the adjustment is performed. The adjustment is performed by narrowing a specific region, and thus, the resolution of the dimming mirror 14 and the resolution of the in-vehicle camera 11 for each adjustment item can further approach each other. For example, since the gradation of the same region is greatly different between the mirror image 41 and the conversion video 43, the tones of the images can approach each other by narrowing the region in which the adjustment is performed. Accordingly, since the rearview display device 1 can further match the appearances of the mirror image 41 and the conversion video 43 than in a case where only the luminance adjustment is performed, the uncomfortable feeling of the driver due to the separation display is reduced, and the viewability of the driver can be improved. Examples of the specific region include a left region, a central region, and a right region of the display region 50. The central region mentioned herein is a region interposed between the left region and the right region. Examples of the specific region include a region including a specific object (vehicle, person, building, roadway, or landscape) displayed on the mirror image 41 or the conversion video 43 in the display region 50.

As stated above, the rearview display device 1 separates the display region 50 into the upper region 51 and the lower region 52, and displays the conversion video 43 in the upper region 51 and displays the mirror image 41 in the lower region 52. In other words, the rearview display device 1 separately displays the mirror image 41 and the conversion video 43 in the display region 50. Accordingly, the mirror image 41 and the conversion video 43 do not appear so as to be superimposed to the eyes of the driver. Accordingly, the driver can clearly view both the mirror image 41 and the conversion video 43.

In the display region 50, the regions in which the mirror image 41 and the conversion video 43 are displayed may be inverted vertically. In this case, the video processing unit 24 converts the upper half of the generated conversion video 43 into the dark video. The video processing unit 24 displays the conversion video 43 of which the upper half is converted into the dark video such that the conversion video is superimposed on the mirror image 41 in the display region 50. Accordingly, the rearview display device 1 can display the mirror image 41 in the upper region 51 and display the conversion video 43 in the lower region 52.

The upper region 51 and the lower region 52 need not be exactly half of the display region 50. In other words, the upper region 51 and the lower region 52 need not be equal to each other. For example, the rearview display device 1 can set any one of the upper region 51 and the lower region 52 to be larger than the other region. Accordingly, the rearview display device 1 displays the mirror image 41 being larger than the conversion video 43 or displays the conversion video 43 being larger than the mirror image 41. In a case where the driver confirms whether or not the conversion video 43 is inverted during the traveling of the vehicle 2, the conversion video 43 viewed by the driver before the confirmation is greatly changed during the confirmation, and thus, there is a concern that the rear side confirmation of the driver is hindered. Thus, it is preferable that the rearview display device 1 displays the mirror image 41 being smaller than the conversion video 43 during the traveling of the vehicle 2. Accordingly, the rearview display device 1 can allow the driver to confirm whether or not the conversion video 43 is inverted, and can restrain the display of the conversion video 43 from being greatly changed.

The display 13 may be a display such as a liquid crystal display that displays the conversion video 43 by using the backlights. In this case, the rearview display device 1 can display only the mirror image 41 in the lower region 52 by darkening or turning on and off a portion of the backlights which illuminates the lower region 52 in which the mirror image 41 is displayed. The video processing unit 24 needs not convert the lower half of the conversion video 43 into the dark video.

Confirmation for Inversion

The driver can confirm whether or not the confirmation video 43 is inverted by confirming whether or not an object displayed in the display region 50 is a contiguous image at a boundary between the mirror image 41 and the conversion video 43 separately displayed in the up-down direction. In a case where the conversion video 43 is correctly displayed, the following vehicle is displayed, as an image contiguous in the up-down direction of the display region 50, a confirmation region 53 including a boundary between the mirror image 41 and the conversion video 43, as shown in FIG. 9. The driver can confirm that the conversion video 43 is correctly displayed, that is, the conversion video 43 is not inverted by viewing the following vehicle within the confirmation region 53. In contrast, in a case where the conversion video 43 is not correctly displayed, the following vehicle is displayed, as an image broken in the up-down direction, in the confirmation region 53. The driver can confirm that the conversion video 43 is not correctly displayed by viewing an incontiguous image of the following vehicle displayed in the confirmation region 53.

The driver can confirm whether or not an upper portion and a lower portion of an object such as the following vehicle displayed in the rearview display device 1 are displayed at the same positions of the mirror image 41 and the conversion video 43. For example, the driver confirms that the following vehicle is displayed at the same position such as the left side or the middle of the upper region 51 and the lower region 52. Accordingly, the driver can confirm that the conversion video 43 is displayed so as to be vertically inverted, is displayed so as to be horizontally inverted, or is correctly displayed without being rotated.

Enhancement Display of Conversion Video 43

In a case where the conversion video 43 is correctly displayed without being inverted during the separation display, the driver can similarly view the mirror image 41 and the conversion video 43 in the upper region 51 and the lower region 52. In this case, there is a concern that the driver is unaware of the separation display. Thus, it is preferable that the video processing unit 24 performs enhancement display of the conversion video 43 in the display region 50 during the separation display. For example, the video processing unit 24 performs the enhancement display of the conversion video 43 by displaying a frame line disposed around the conversion video 43 in the display region 50. Accordingly, it is possible to clarify the mirror image 41 and the conversion video 43 in the display region 50. The driver can be clearly aware that the mirror image 41 and the conversion video 43 are separately displayed by viewing the frame line around the conversion video 43. As stated above, the rearview display device 1 can alert the driver that the separation display in the up-down direction is performed.

The video processing unit 24 may perform the enhancement display of the conversion video 43 by using another method. For example, the video processing unit 24 can perform the enhancement display of the conversion video 43 by displaying a boundary line disposed at the boundary between the mirror image 41 and the conversion video 43 in the display region 50, filling the entire conversion video 43 in a light color, or displaying an icon indicating that the separation display in the up-down direction is performed in the display 13 or an indicator. The rearview display device 1 can notify the driver that the enhancement display of the conversion video 43 is performed through sound.

Display of Camera Video 42

The video processing unit 24 may display the entire camera video 42 or any part thereof before the angles of view of the camera video and the mirror image 41 are aligned with each other in the display region 50 instead of the conversion video 43. In this case, the driver confirms whether or not an object (for example, the following vehicle or the edge of the roadway) as a mark displayed in the display region 50 is displayed at the same position in the mirror image 41 and the camera video 42.

Three-Separation Display of Up-Down Direction

Figure 10:
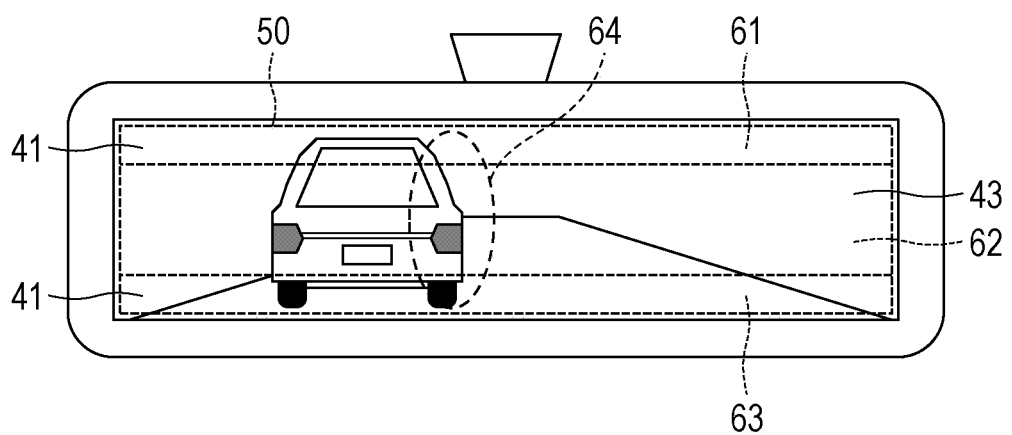
FIG. 10 is a diagram showing an example in which the rearview display device according to the second embodiment of the present disclosure separately displays the mirror image and the conversion video in three regions in the up-down direction of the display region.

FIG. 10 is a diagram showing an example in which the rearview display device 1 according to the second embodiment of the present disclosure separately displays the mirror image 41 and the conversion video 43 in three regions in the up-down direction of the display region 50. In the example of FIG. 10, the video processing unit 24 converts both the upper portion and the lower portion of the generated conversion video 43 except for the central portion into the dark video (for example, black video). The video processing unit 24 displays the conversion video 43 of which the upper portion and the lower portion are converted into the dark video such that the conversion video is superimposed on the mirror image 41 in the display region 50. In this case, the luminance control unit 22 sufficiently increases the luminance of the display 13. Accordingly, the rearview display device 1 separates the display region 50 into three regions of an upper region 61, a central region 62, and a lower region 63, and displays the mirror image 41 in the upper region 61 and the lower region 63 and displays the conversion video 43 in the central region 62. In the example of FIG. 10, the central region 62 is larger than the upper region 61 and the lower region 63.

In the example of FIG. 10, the rearview display device 1 separately displays the mirror image 41 and the conversion video 43 in three regions of the display region 50. Accordingly, the mirror image 41 and the conversion video 43 do not appear so as to be superimposed to the eyes of the driver. Accordingly, the driver can clearly view both the mirror image 41 and the conversion video 43.

The driver is more likely to see the central region 62 than to see the periphery within the display region 50 at the time of confirming the rearview display device 1. Thus, the rearview display device 1 can display the mirror image 41 in the display region 50 without greatly changing the conversion video 43 of the rear side viewed by the driver by displaying the conversion video 43 in the central region 62 of the display region 50. Accordingly, the rearview display device 1 can prompt the driver to confirm whether or not the conversion video 43 is inverted not only in a case where the vehicle 2 stops but also in a case where the vehicle travels.

The video processing unit 24 can reduce the entire conversion video 43 and display the entire reduced conversion video 43 in the central region 62. In this case, the rearview display device 1 can display, as the conversion video 43, the entire image capturing range corresponding to the angle of view of the in-vehicle camera 11 in the display region 50. The driver confirms whether or not a state of an object appearing in the periphery within the conversion video 43 and a state of an object appearing in the periphery within the mirror image 41 are the same. For example, the driver confirms whether or not a plurality of objects included in the mirror image 41 and a plurality of objects included in the conversion video 43 are the same and whether or not arrangement orders of the objects in the mirror image 41 and the conversion video 43 are the same. Accordingly, the driver can confirm whether or not the conversion video 43 is horizontally inverted.

The rearview display device 1 may display the same image as the image of the mirror image 41 and the conversion video 43 displayed in the entire display region 50 before the separation display in the central region 62 during the separation display. Specifically, in a case where the mirror image 41 is displayed in the display region 50 during the separation display, the mirror image 41 is displayed in the central region 62 during the separation display, and the conversion video 43 is displayed in the upper region 61 and the lower region 63. Meanwhile, in a case where the conversion video 43 is displayed in the entire display region 50 before the separation display, the conversion video 43 is displayed in the central region 62 during the separation display, and the mirror image 41 is displayed in the upper region 61 and the lower region 63. Since the region within the display region 50 to be viewed by the driver is principally the central region 62, it is possible to suppress a difference in display between the images before and after the separation display is started to the minimum by matching the image viewed by the driver before the separation display is started with the image displayed in the central region 62 during the separation display. Accordingly, it is possible to reduce the confusion of the driver due to a change of the image displayed in the display region 50.

Various modification examples related to the two-separation display described with reference to FIG. 9 are equally applied to the three-separation display based on FIG. 10. For example, in the example of FIG. 10, the rearview display device 1 can display the conversion video 43 in the upper region 61 and the lower region 63, and display the mirror image 41 in the central region 62. The rearview display device 1 can set the central region 62 to be smaller than the upper region 61 and the lower region 63. The rearview display device 1 can perform the enhancement display of the conversion video 43 as in the case of FIG. 9. The rearview display device 1 can display only the mirror image 41 in the upper region 61 and the lower region 63 by darkening or turning on and off a portion of the backlights which illuminates the upper region 61 and the lower region 63.

In the example of FIG. 10, the reflectance control unit 21 may control the reflectance of the dimming mirror 14 and the luminance control unit 22 may adjust the luminance of the display 13 such that the luminance of the mirror image 41 and the luminance of the conversion video 43 to be recognized by the driver are equal, as in the example of FIG. 9. In the example of FIG. 10, the rearview display device 1 may adjust contrast, dynamic range, color, and resolution in addition to the adjustment of the luminance, as in the example of FIG. 9. In the example of FIG. 10, the rearview display device 1 may limit the region of the display region 50 in which the adjustment is performed to a specific region, as in the example of FIG. 9. Examples of the specific region mentioned herein include a left region, a central region, or a right region of the display region 50. The central region mentioned herein is a region interposed between the left region and the right region. Examples of the specific region include a region including a specific object (vehicle, person, building, roadway, or landscape) displayed on the mirror image 41 or the conversion video 43 in the display region 50.

Two-Separation Display in Left-Right Direction

Figure 11:
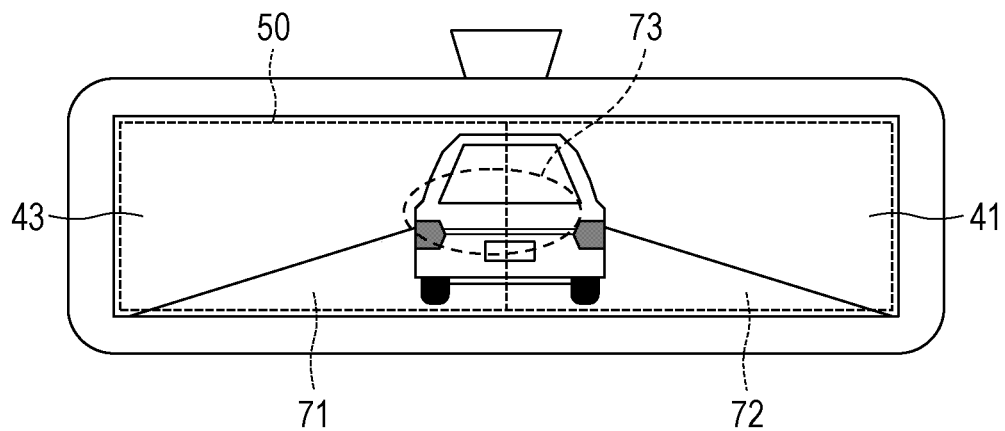
FIG. 11 is a diagram showing an example in which the rearview display device according to the second embodiment of the present disclosure separately displays the mirror image and the conversion video in two regions in a left-right direction of the display region.

FIG. 11 is a diagram showing an example in which the rearview display device 1 according to the second embodiment of the present disclosure separately displays the mirror image 41 and the conversion video 43 in two regions in a left-right direction of the display region 50. In the example of FIG. 11, the video processing unit 24 converts a right half of the generated conversion video 43 into a dark video (for example, black video). The video processing unit 24 displays the conversion video 43 of which the right half is converted into the dark video such that the conversion video is superimposed on the mirror image 41 in the display region 50. In this case, the luminance control unit 22 sufficiently increases the luminance of the display 13. Accordingly, the rearview display device 1 separates the display region 50 into two regions of a left region 71 and a right region 72, and displays the conversion video 43 in the left region 71 and displays the mirror image 41 in the right region 72. In the example of FIG. 11, the sizes of the left region 71 and the right region 72 are equal to each other.

In the example shown in FIG. 11, the rearview display device 1 separately displays the mirror image 41 and the conversion video 43 in two regions of the display region 50. Accordingly, the mirror image 41 and the conversion video 43 do not appear so as to be superimposed to the eyes of the driver. Accordingly, the driver can clearly view both the mirror image 41 and the conversion video 43.

In a case where the conversion video 43 is correctly displayed, the following vehicle is displayed, as an image contiguous in the left-right direction of the display region 50 in a confirmation region 73 including the boundary between the mirror image 41 and the conversion video 43, as shown in FIG. 11. The driver can confirm that the conversion video 43 is correctly displayed, that is, the conversion video 43 is not horizontally inverted by viewing the following vehicle within the confirmation region 73. In contrast, in a case where the conversion video 43 is not correctly displayed, the following vehicle is displayed, as an image broken in the left-right direction, in the confirmation region 73. The driver can confirm that the conversion video 43 is not correctly displayed by viewing an incontiguous of the following vehicle within the confirmation region 73.

The driver can confirm whether or not the conversion video 43 is correctly displayed by confirming whether or not the same object is displayed both the left region 71 and the right region 72. For example, the driver can confirm that the conversion video 43 is correctly displayed in a case where the same object is not displayed in the left region 71 and the right region 72. The driver can confirm that the conversion video 43 is not correctly displayed in a case where the same object is displayed in the left region 71 and the right region 72.

In a case where the vehicle 2 travels on a one-sided two-lane roadway, the following vehicle travels near any of left and right lanes. In a case where the mirror image 41 and the conversion video 43 are separately displayed in the left-right direction of the display region 50, the same object (following vehicle) is displayed in both the left region 71 and the right region 72. Accordingly, the driver can be easily aware that the conversion video 43 is displayed so as to be inverted by viewing the same object displayed in the left region 71 and the right region 72.

Various modification examples related to the two-separation display described with reference to FIG. 9 are equally applied to the two-separation display in the left-right direction based on FIG. 11. For example, in the example of FIG. 11, the rearview display device 1 can display the conversion video 43 in the left region 71, and display the mirror image 41 in the right region 72. The rearview display device 1 can set any one of the left region 71 and the right region 72 to be larger than the other region. It is preferable that the rearview display device 1 displays the mirror image 41 being smaller than the conversion video 43 during the traveling of the vehicle 2. The rearview display device 1 can perform the enhancement display of the conversion video 43 as in the case of FIG. 9. The rearview display device 1 can display only the mirror image 41 in the right region 72 by darkening or turning on and off a portion of the backlights which illuminates the right region 72.

In the example of FIG. 11, the reflectance control unit 21 may control the reflectance of the dimming mirror 14 and the luminance control unit 22 may adjust the luminance of the display 13 such that the luminance of the mirror image 41 and the luminance of the conversion video 43 to be recognized by the driver are equal, as in the example of FIG. 9. In the example of FIG. 11, the rearview display device 1 may adjust contrast, dynamic range, color, and resolution in addition to the adjustment of the luminance, as in the example of FIG. 9. In the example of FIG. 11, the rearview display device 1 may limit the region of the display region 50 in which the adjustment is performed to a specific region, as in the example of FIG. 9. Examples of the specific region mentioned herein include an upper region, a central region, or a lower region of the display region 50. The central region mentioned herein is a region interposed between the upper region and the lower region. Examples of the specific region include a region including a specific object (vehicle, person, building, roadway, or landscape) displayed on the mirror image 41 or the conversion video 43 in the display region 50.

Three-Separation Display in Left-Right Direction

Figure 12:
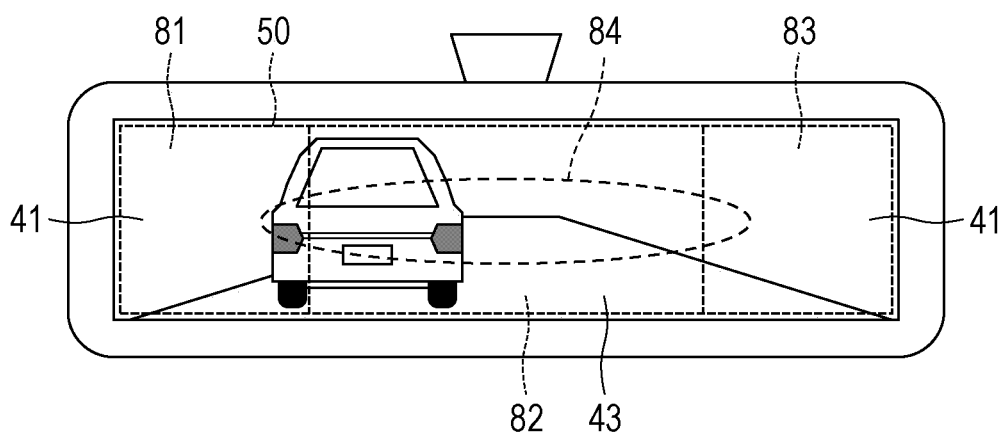
FIG. 12 is a diagram showing an example in which the rearview display device according to the second embodiment of the present disclosure separately displays the mirror image and the conversion video in three regions in the left-right direction of the display region.

FIG. 12 is a diagram showing an example in which the rearview display device 1 according to the second embodiment of the present disclosure separately displays the mirror image 41 and the conversion video 43 in three regions in the left-right direction of the display region 50. In the example of FIG. 12, the video processing unit 24 converts the left portion and the right portion of the generated conversion video 43 except for the central portion in the left-right direction into the dark video (for example, black video). The video processing unit 24 displays the conversion video 43 of which the left portion and the right portion are converted into the dark video such that the conversion video is superimposed on the mirror image 41 in the display region 50. In this case, the luminance control unit 22 sufficiently increases the luminance of the display 13. Accordingly, the rearview display device 1 separates the display region 50 into three regions of a left region 81, a central region 82, and a right region 83, and displays the mirror image 41 in the left region 81 and the right region 83 and displays the conversion video 43 in the central region 82. In the example of FIG. 12, the central region 82 is larger than the left region 81 and the right region 83.

In the example of FIG. 12, the rearview display device 1 separately displays the mirror image 41 and the conversion video 43 in three regions in the display region 50. Accordingly, the mirror image 41 and the conversion video 43 do not appear so as to be superimposed to the eyes of the driver. Accordingly, the driver can clearly view both the mirror image 41 and the conversion video 43.

In a case where the conversion video 43 is correctly displayed, the following vehicle is displayed, as an image contiguous in the left-right direction of the display region 50, in a confirmation region 84 including both the boundary between the left mirror image 41 and the conversion video 43, and the enhancement of the right mirror image 41 and the conversion video 43, as shown in FIG. 12. The driver can confirm that the conversion video 43 is correctly displayed, that is, the conversion video 43 is not horizontally inverted by viewing the following vehicle within the confirmation region 84. In contrast, in a case where the conversion video 43 is not correctly displayed, the following vehicle is displayed, as an image broken in the left-right direction, in the confirmation region 84. The driver can confirm that the conversion video 43 is not correctly displayed by viewing an incontiguous of the following vehicle within the confirmation region 84.

The driver can confirm whether or not the conversion video 43 is correctly displayed by confirming whether or not the same object is displayed both the left region 81 and the central region 82. For example, the driver can confirm that the conversion video 43 is correctly displayed in a case where the same object is not displayed in the left region 81 and the central region 82. The driver can confirm that the conversion video 43 is not correctly displayed in a case where the same object is displayed in the left region 81 and the central region 82. The driver can also confirm whether or not the conversion video 43 is correctly displayed by confirming whether or not the same object is displayed both the right region 83 and the central region 82.

The driver is more likely to see the central region 82 than to see the periphery within the display region 50 at the time of confirming the rearview display device 1. Thus, the rearview display device 1 can display the mirror image 41 in the display region 50 without greatly changing the conversion video 43 of the rear side viewed by the driver by displaying the conversion video 43 in the central region 82 of the display region 50. Accordingly, the rearview display device 1 can prompt the driver to confirm whether or not the conversion video 43 is inverted not only in a case where the vehicle 2 stops but also in a case where the vehicle travels.

The video processing unit 24 can reduce the entire conversion video 43, and can display the entire reduced conversion video 43 in the central region 82. In this case, the rearview display device 1 can display, as the conversion video 43, the entire image capturing range corresponding to the angle of view of the in-vehicle camera 11 in the display region 50. The driver confirms whether or not a state of an object appearing in the periphery within the conversion video 43 and a state of an object appearing in the periphery within the mirror image 41 are the same. For example, the driver confirms whether or not a plurality of objects included in the mirror image 41 and a plurality of objects included in the conversion video 43 are the same and whether or not arrangement orders of the objects in the mirror image 41 and the conversion video 43 are the same. Accordingly, the driver can confirm whether or not the conversion video 43 is horizontally inverted.

Various modification examples related to the two-separation display described with reference to FIG. 9 are equally applied to the three-separation display in the left-right direction based on FIG. 12. For example, in the example of FIG. 12, the rearview display device 1 can display the conversion video 43 in the left region 81 and the right region 83, and display the mirror image 41 in the central region 82. The rearview display device 1 can set the central region 82 to be smaller than the left region 81 and the right region 83. The rearview display device 1 can perform the enhancement display of the conversion video 43 as in the case of FIG. 9. The rearview display device 1 can display only the mirror image 41 in the left region 81 and the right region 83 by darkening or turning on and off a portion of the backlights which illuminates the left region 81 and the right region 83.

In the example of FIG. 12, the reflectance control unit 21 may control the reflectance of the dimming mirror 14 and the luminance control unit 22 may adjust the luminance of the display 13 such that the luminance of the mirror image 41 and the luminance of the conversion video 43 to be recognized by the driver are equal, as in the example of FIG. 9. In the example of FIG. 12, the rearview display device 1 may adjust contrast, dynamic range, color, and resolution in addition to the adjustment of the luminance, as in the example of FIG. 9. In the example of FIG. 12, the rearview display device 1 may limit the region of the display region 50 in which the adjustment is performed to a specific region, as in the example of FIG. 9. Examples of the specific region mentioned herein include a right region, a central region, or a left region of the display region 50. The central region mentioned herein is a region interposed between the upper region and the lower region. Examples of the specific region include a region including a specific object (vehicle, person, building, roadway, or landscape) displayed on the mirror image 41 or the conversion video 43 in the display region 50.

Various modification examples related to the three-separation display described with reference to FIG. 10 is equally applied to the three-separation display in the left-right direction based on FIG. 12. For example, the rearview display device 1 may display the same image as the image of the mirror image 41 and the conversion video 43 displayed in the entire display region 50 before the separation display in the central region 82 during the separation display. Specifically, in a case where the mirror image 41 is displayed in the display region 50 during the separation display, the mirror image 41 is displayed in the central region 82 during the separation display, and the conversion video 43 is displayed in the left region 81 and the right region 83. Meanwhile, in a case where the conversion video 43 is displayed in the entire display region 50 before the separation display, the conversion video 43 is displayed in the central region 82 during the separation display, and the mirror image 41 is displayed in the left region 81 and the right region 83.

Center-Separation Display

Figure 13:
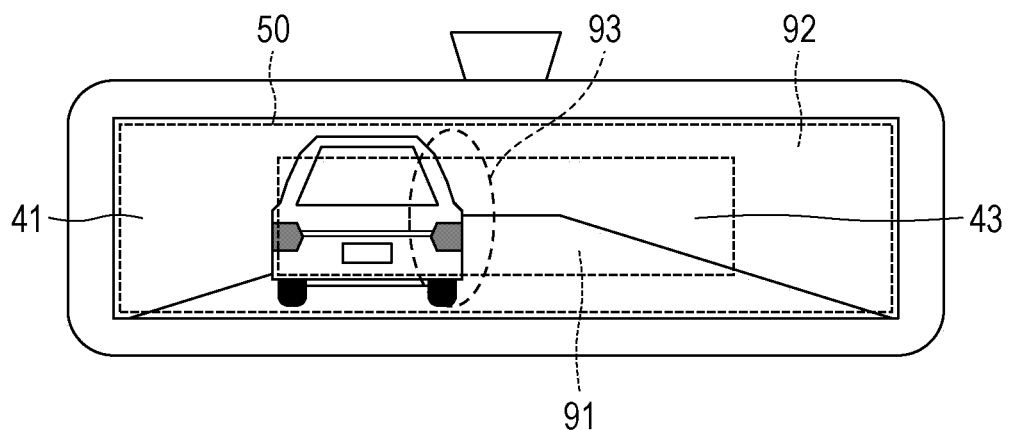
FIG. 13 is a diagram showing an example in which the rearview display device according to the second embodiment of the present disclosure separately displays the mirror image and the conversion video in two regions of a central region and a peripheral region of the display region.

FIG. 13 is a diagram showing an example in which the rearview display device 1 according to the second embodiment of the present disclosure separately displays the mirror image 41 and the conversion video 43 in two regions of a central region and a peripheral region of the display region 50. In the example of FIG. 13, the video processing unit 24 converts the peripheral region of the generated conversion video 43 except for the central region into a dark video (for example, black vide). The video processing unit 24 displays the conversion video 43 of which the peripheral portion is converted into the dark video such that the conversion video is superimposed on the mirror image 41 in the display region 50. In this case, the luminance control unit 22 sufficiently increases the luminance of the display 13. Accordingly, the rearview display device 1 separates the display region 50 into two regions of a central region 91 and a peripheral region 92, and displays the conversion video 43 in the central region 91 and displays the mirror image 41 in the peripheral region 92. In other words, the rearview display device 1 separately displays the mirror image 41 and the conversion video 43 in two regions of the display region 50.

Accordingly, the mirror image 41 and the conversion video 43 do not appear so as to be superimposed to the eyes of the driver. Accordingly, the driver can clearly view both the mirror image 41 and the conversion video 43.

In a case where the conversion video 43 is correctly displayed, the following vehicle is displayed, as an image contiguous in the up-down direction of the display region 50 in a confirmation region 93 including the boundary between the mirror image 41 and the conversion video 43, as shown in FIG. 13. The driver can confirm that the conversion video 43 is correctly displayed, that is, the conversion video 43 is not horizontally inverted by viewing the following vehicle within the confirmation region 93. In contrast, in a case where the conversion video 43 is not correctly displayed, the following vehicle is displayed, as an image broken in the up-down direction, in the confirmation region 93. The driver can confirm that the conversion video 43 is not correctly displayed by viewing an incontiguous of the following vehicle within the confirmation region 93.

In the example of FIG. 13, all peripheral edges of the conversion video 43 are in contact with inner peripheral edges of the mirror image 41. Accordingly, the rearview display device 1 can display one integrated video including the mirror image 41 and the conversion video 43 in the display region 50. Thus, the driver can determine whether or not the conversion video 43 is correctly displayed at a glance.

In the example of FIG. 13, a range in which the mirror image 41 and the conversion video 43 are in contact with each other is larger than in the examples of FIGS. 9 to 12. Accordingly, even though the number of objects included in the image capturing range of the in-vehicle camera 11 is small, the confirmation region 93 in which the driver can confirm the continuity of the image of the object in the display region 50 is increased probabilistically. Accordingly, the driver can easily confirm whether or not the conversion video 43 is correctly displayed by looking around the boundary between the mirror image 41 and the conversion video 43 as a whole.

The driver is more likely to see the central region 91 than to see the periphery within the display region 50 at the time of confirming the rearview display device 1. Thus, the rearview display device 1 can display the mirror image 41 in the display region 50 without greatly changing the conversion video 43 of the rear side viewed by the driver by displaying the conversion video 43 in the central region 91 of the display region 50. Accordingly, the rearview display device 1 prompts the driver to confirm whether or not the conversion video 43 is inverted not only in a case where the vehicle 2 stops but also in a case where the vehicle travels.

Various modification examples related to the two-separation display described with reference to FIG. 9 are equally applied to the center-separation display based on FIG. 13. For example, in the example of FIG. 13, the rearview display device 1 can display the mirror image 41 in the central region 91, and display the conversion video 43 in the peripheral region 92. The rearview display device 1 can perform the enhancement display of the conversion video 43 as in the case of FIG. 9. The rearview display device 1 can display only the mirror image 41 in the peripheral region 92 by darkening or turning on and off a portion of the backlights which illuminates the peripheral region 92.

In the example of FIG. 13, the reflectance control unit 21 may control the reflectance of the dimming mirror 14 and the luminance control unit 22 may adjust the luminance of the display 13 such that the luminance of the mirror image 41 and the luminance of the conversion video 43 to be recognized by the driver are equal, as in the example of FIG. 9. In the example of FIG. 13, the rearview display device 1 may adjust contrast, dynamic range, color, and resolution in addition to the adjustment of the luminance, as in the example of FIG. 9. In the example of FIG. 13, the rearview display device 1 may limit the region of the display region 50 in which the adjustment is performed to a specific region, as in the example of FIG. 9. Examples of the specific region mentioned herein include an upper region, a lower region, a central region, a left region, or a right region of the display region 50. The central region mentioned herein is a region interposed between the upper region and the lower region or a region interposed between the left region and the right region. Examples of the specific region include a region including a specific object (vehicle, person, building, roadway, or landscape) displayed on the mirror image 41 or the conversion video 43 in the display region 50.

Various modification examples related to the three-separation display described with reference to FIG. 10 is equally applied to the center-separation display based on FIG. 13. For example, the rearview display device 1 may display the same image as the image of the mirror image 41 and the conversion video 43 displayed in the entire display region 50 before the separation display in the central region 91 during the separation display. Specifically, in a case where the mirror image 41 is displayed in the display region 50 during the separation display, the mirror image 41 is displayed in the central region 91 during the separation display, and the conversion video 43 is displayed in the peripheral region 92. Meanwhile, in a case where the conversion video 43 is displayed in the entire display region 50 before the separation display, the conversion video 43 is displayed in the central region 91 during the separation display, and the mirror image 41 is displayed in the peripheral region 92.

Another Example of Center-Separation Display

Figure 14:
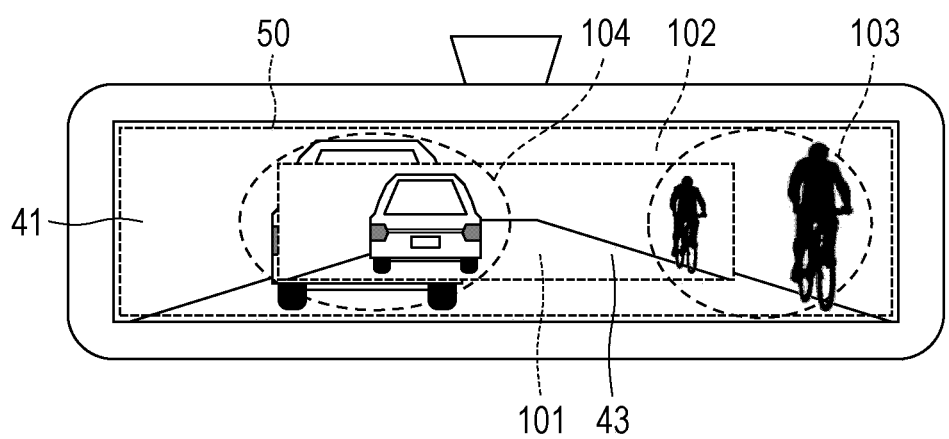
FIG. 14 is a diagram showing an example in which the rearview display device according to the second embodiment of the present disclosure separately displays the mirror image and the conversion video in two regions of a central region and a peripheral region of the display region.

FIG. 14 is a diagram showing an example in which the rearview display device 1 according to the second embodiment of the present disclosure separately displays the mirror image 41 and the conversion video 43 in two regions of a central region and a peripheral region of the display region 50. In the example of FIG. 14, the video processing unit 24 reduces the entire generated conversion video 43. The video processing unit 24 separates the display region 50 into a central region 101 (first region) and a peripheral region 102 (second region) disposed in the periphery thereof. The peripheral region 102 is a region of the display region 50 except for the central region 101. The video processing unit 24 displays the entire reduced conversion video 43 in the central region 101, and displays the dark video (for example, black video) in the peripheral region 102. Accordingly, the rearview display device 1 can display the reduced conversion video 43 in the central region 101, and display the mirror image 41 in the peripheral region 102. In other words, the rearview display device 1 separately displays the mirror image 41 and the conversion video 43 in two regions of the display region 50. Accordingly, the mirror image 41 and the conversion video 43 do not appear so as to be superimposed to the eyes of the driver.

Accordingly, the driver can clearly view both the mirror image 41 and the conversion video 43.

In the example of FIG. 14, the rearview display device 1 can display, as the conversion video 43, the entire image capturing range corresponding to the angle of view of the in-vehicle camera 11 in the display region 50. The driver confirms whether or not a state of an object appearing in the peripheral region within the conversion video 43 and a state of an object appearing in the peripheral region within the mirror image 41 are the same. For example, the driver confirms whether or not a plurality of objects included in the mirror image 41 and a plurality of objects included in the conversion video 43 are the same and whether or not arrangement orders of the objects in the mirror image 41 and the conversion video 43 are the same. Accordingly, the driver can confirm whether or not the conversion video 43 is horizontally inverted.

In FIG. 14, vehicles which are the same object appear at a right edge within the mirror image 41 and a right edge within the conversion video 43. In other words, the objects appearing in the peripheral region (a right edge region in the present example) within the mirror image 41 and the peripheral region (a right edge region in the present example) within the conversion video 43 are the same. Accordingly, the driver can confirm that the conversion video 43 is correctly displayed by viewing a confirmation region 103 in which two vehicles are included.

The driver can compare the objects appearing in the regions by using, as a target, any one region of all upper edge regions, lower edge regions, left edge regions, and peripheral regions within the mirror image 41 and the conversion video 43. The driver can compare the objects appearing in the regions by using, as a target, a plurality of any regions of these regions.

The example of FIG. 14 is effective in a case where the entire object appearing in the mirror image 41 is displayed. Since the object is not hidden by the conversion video 43, the driver can compare the object appearing in the conversion video 43 with the object appearing in the mirror image 41. In other words, the driver can easily view two objects.

The driver can also confirm whether or not the conversion video 43 is correctly displayed depending on whether or not a relative position of the object (for example, the following vehicle) on the mirror image 41 matches with a relative position of the same object on the conversion video 43. In the example of FIG. 14, the following vehicle is reflected in the left side within the mirror image 41 and is reflected in the left side within the conversion video 43. In other words, the relative positions of the same objects are equal to each other on the mirror image 41 and the conversion video 43. Accordingly, the driver can confirm that the conversion video 43 is correctly displayed by confirming a confirmation region 104 including two following vehicles. The example of FIG. 14 is effective in a case where the object appearing in the mirror image 41 is hidden by the conversion video 43.

Various modification examples related to the two-separation display described with reference to FIG. 9 are equally applied to the center-separation display based on FIG. 14. For example, in the example of FIG. 14, the rearview display device 1 can display the mirror image 41 in the central region 101, and display the conversion video 43 in the peripheral region 102. The rearview display device 1 can perform the enhancement display of the conversion video 43 as in the case of FIG. 9. The rearview display device 1 can display only the mirror image 41 in the peripheral region 102 by darkening or turning on and off a portion of the backlights which illuminates the peripheral region 102.

In the example of FIG. 14, the reflectance control unit 21 may control the reflectance of the dimming mirror 14 and the luminance control unit 22 may adjust the luminance of the display 13 such that the luminance of the mirror image 41 and the luminance of the conversion video 43 to be recognized by the driver are equal, as in the example of FIG. 9. In the example of FIG. 14, the rearview display device 1 may adjust contrast, dynamic range, color, and resolution in addition to the adjustment of the luminance, as in the example of FIG. 9. In the example of FIG. 14, the rearview display device 1 may limit the region of the display region 50 in which the adjustment is performed to a specific region, as in the example of FIG. 9. Examples of the specific region mentioned herein include an upper region, a lower region, a central region, a left region, or a right region of the display region 50. The central region mentioned herein is a region interposed between the upper region and the lower region or a region interposed between the left region and the right region. Examples of the specific region include a region including a specific object (vehicle, person, building, roadway, or landscape) displayed on the mirror image 41 or the conversion video 43 in the display region 50.

Various modification examples related to the three-separation display described with reference to FIG. 10 is equally applied to the center-separation display based on FIG. 14. For example, the rearview display device 1 may display the same image as the image of the mirror image 41 and the conversion video 43 displayed in the entire display region 50 before the separation display in the central region 101 during the separation display. Specifically, in a case where the mirror image 41 is displayed in the display region 50 during the separation display, the mirror image 41 is displayed in the central region 101 during the separation display, and the conversion video 43 is displayed in the peripheral region 92. Meanwhile, in a case where the conversion video 43 is displayed in the entire display region 50 before the separation display, the conversion video 43 is displayed in the central region 101 during the separation display, and the mirror image 41 is displayed in the peripheral region 102.

Example of Process Flow

Figure 15:
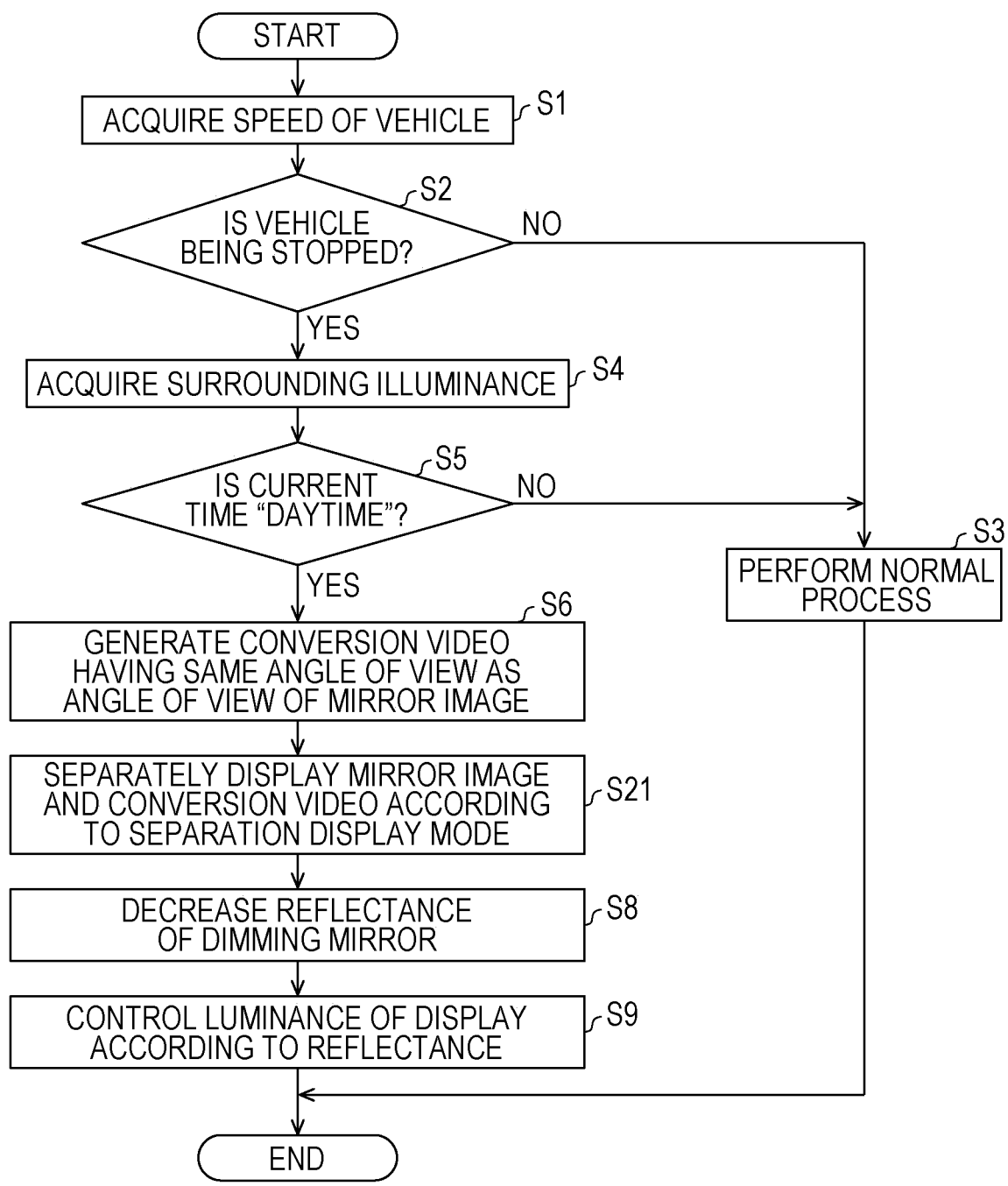
FIG. 15 is a flowchart showing a flow of a series of processes performed by the rearview display device according to the second embodiment of the present disclosure.

FIG. 15 is a flowchart showing a flow of a series of processes performed by the rearview display device 1 according to the second embodiment of the present disclosure.

Before the processes of FIG. 15 are performed, the driver selects a separation display mode by operating the operation unit 31. The separation display mode is a separation display example shown in any of FIGS. 9 to 14. Any user different from the driver can select the separation display mode. The rearview display device 1 stores the selected separation display mode. Since the processes of steps S1 to S9 among the processes shown in FIG. 15 are the same as the processes shown in FIG. 6, the detailed description will be omitted.

After step S6, in step S21, the video processing unit 24 separately displays the mirror image 41 and the conversion video 43 in the display region 50 according to the separation display mode selected by the driver. In a case where the separation display mode corresponding to any of FIGS. 8 to 13 is selected, the video processing unit 24 converts a partial region of the conversion video 43 corresponding to the separation display mode into the dark region. The video processing unit 24 separately displays the mirror image 41 and the conversion video 43 in the display region 50 by displaying the conversion video 43 of which the partial region is converted into the dark video such that the conversion video is superimposed on the mirror image 41 in the display region 50. In a case where the separation display mode corresponding to FIG. 14 is selected, the video processing unit 24 reduces the entire conversion video 43, and displays the reduced conversion video 43 in the central region 101. The video processing unit 24 displays the dark video in the peripheral region 102. Accordingly, the video processing unit 24 separately displays the mirror image 41 and the conversion video 43 in the display region 50. The rearview display device 1 may darken or turn on and off a partial portion of the backlights corresponding to the region in which the mirror image 41 of the display region 50 is displayed instead of displaying the dark video.

As stated above, the rearview display device 1 according to the present embodiment separately displays the mirror image 41 and the conversion video 43 in the display region 50. In other words, the rearview display device 1 displays the mirror image 41 and the conversion video 43 such that the mirror image and the conversion video are not superimposed in the display region 50. Accordingly, it is possible to restrain the mirror image 41 and the conversion video 43 from being difficult to be seen by the driver. Since it is possible to improve the visibility of the mirror image 41 and the conversion video 43 to the maximum, the driver can easily confirm whether or not the conversion video 43 is correctly displayed.

The driver can confirm whether or not the conversion video 43 is inverted by a simple confirmation method of confirming the continuity of the images of the objects appearing in the mirror image 41 and the conversion video 43 or confirming the matching of the objects. Accordingly, the driver can confirm whether or not the conversion video 43 is inverted not only in a case where the vehicle 2 stops but also in a case where the vehicle travels.

A timing when the mirror image 41 and the conversion video 43 are separately displayed according to the present embodiment is the same as the timing when the mirror image 41 and the conversion video 43 are displayed so as to be superimposed according to the first embodiment. In the present embodiment, it is possible to perform the separation display even during the traveling of the vehicle 2, and it is effective to perform the separation display during the traveling of the vehicle 2 at a low speed.

Third Embodiment

Configuration of Rearview Display Device 1

Figure 16A:
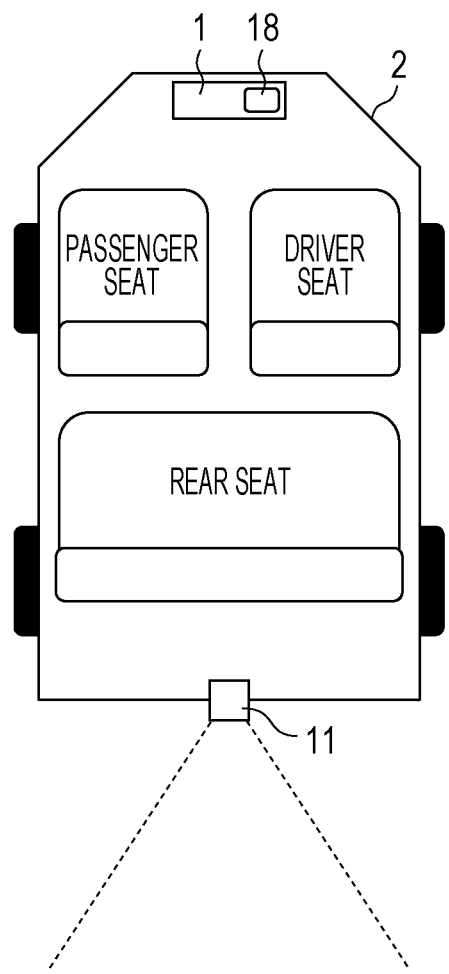
FIGS. 16A and 16B are diagrams showing an example of a vehicle on which a rearview display device according to a third embodiment of the present disclosure is mounted.
Figure 16B:
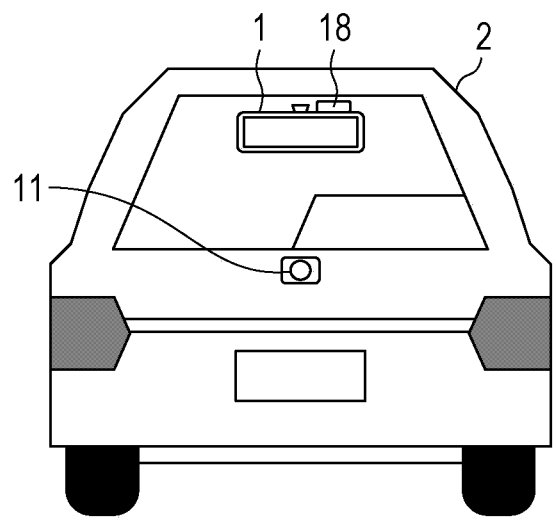

FIGS. 16A and 16B are diagrams showing an example of a vehicle 2 on which a rearview display device 1 according to a third embodiment is mounted. FIG. 16A is a top view of the vehicle 2, and FIG. 16B is a rear view of the vehicle 2. In the present embodiment, the rearview display device 1 and the in-vehicle camera 11 are arranged at the same positions as the positions of the vehicle 2 in FIGS. 1A and 1B. In the present embodiment, a viewpoint detector 18 is disposed at an upper right portion of the rearview display device 1. The position of the viewpoint detector 18 shown in FIGS. 16A and 16B is merely an example. The viewpoint detector 18 may be disposed at a location other than the rearview display device 1. In a case where a location at which the detection accuracy of the viewpoint is higher depending on the characteristics of the viewpoint detector 18 is known, it is preferable that the viewpoint detector 18 is disposed at this location.

Figure 17A:
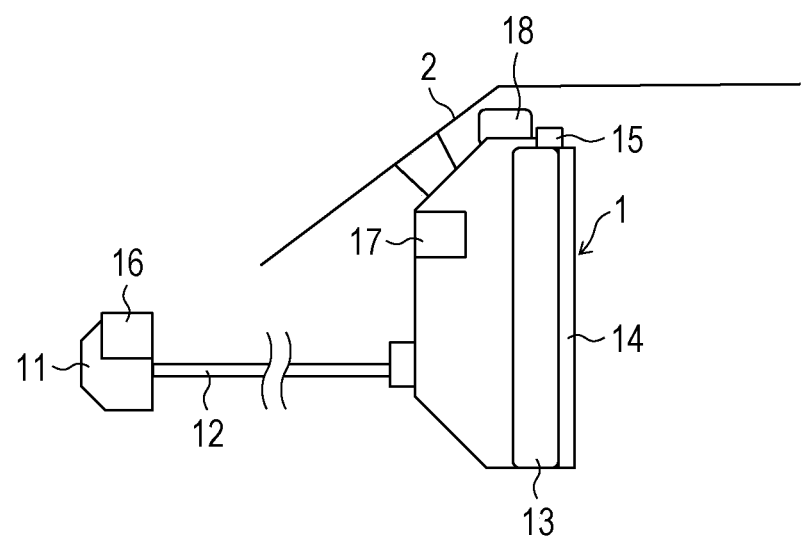
FIGS. 17A and 17B are diagrams showing an example of a detailed configuration of the rearview display device according to the third embodiment of the present disclosure.
Figure 17B:
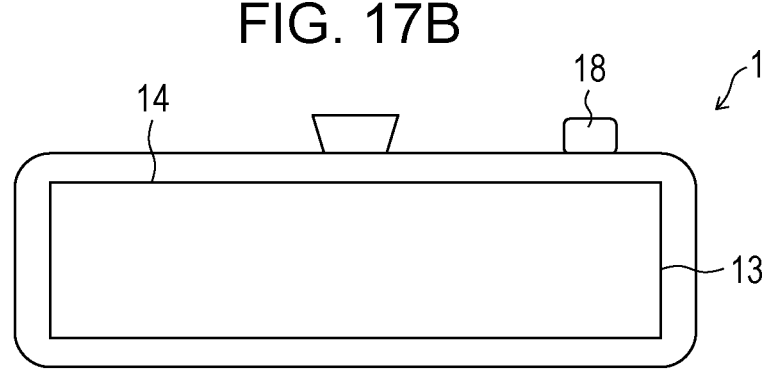

FIGS. 17A and 17B are diagrams showing an example of a detailed configuration of the rearview display device 1 according to the third embodiment of the present disclosure. FIG. 17A shows a side surface of the rearview display device 1, and FIG. 17B shows a front surface of the rearview display device 1. As shown in these diagrams, the rearview display device 1 according to the present embodiment includes an in-vehicle camera 11, a harness 12, a display 13, a dimming mirror 14, an illuminance sensor 15, the viewpoint detector 18, a pose detector 17, and a distance sensor 16. Since the in-vehicle camera 11, the harness 12, the display 13, the dimming mirror 14, and the illuminance sensor 15 are the same as the components in the first embodiment, the detailed description will be omitted.

The distance sensor 16 is installed in the in-vehicle camera 11, and measures a distance between an image capturing target of the in-vehicle camera 11 and the in-vehicle camera 11. The distance sensor 16 needs not be installed in the in-vehicle camera 11. In a case where a positional relationship between the distance sensor 16 and the in-vehicle camera 11 is known to the rearview display device 1, the distance sensor 16 can be installed at any location other than the in-vehicle camera 11. The pose detector 17 is installed in the rearview display device 1, and detects a pose of the rearview display device 1 with respect to the vehicle 2. The viewpoint detector 18 is installed in the rearview display device 1, and detects a viewpoint of the driver.

Figure 18:
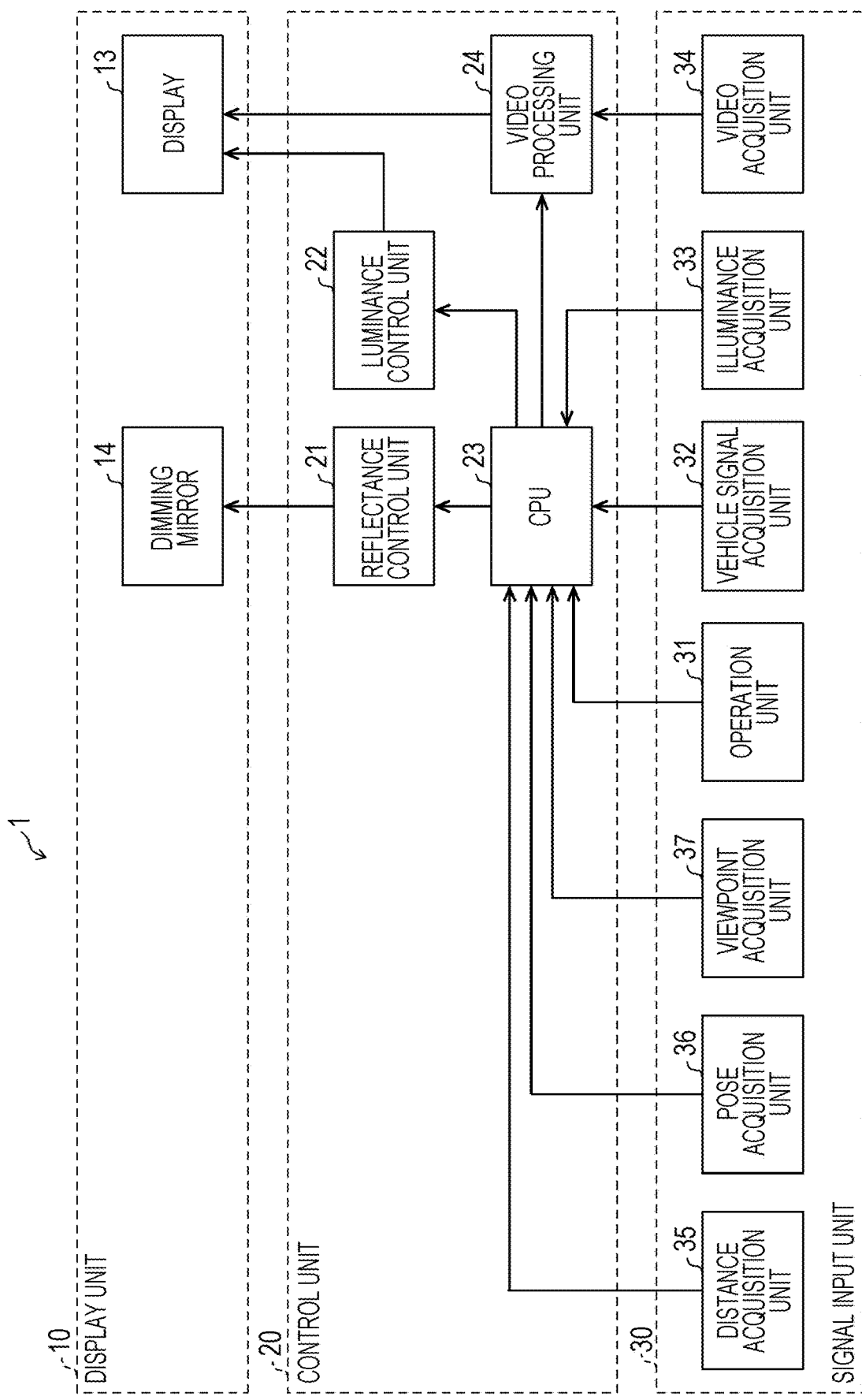
FIG. 18 is a block diagram showing an example of a principal configuration of the rearview display device according to the third embodiment of the present disclosure.

FIG. 18 is a block diagram showing an example of a principal configuration of the rearview display device 1 according to the third embodiment. As shown in this diagram, the rearview display device 1 includes a display unit 10, a control unit 20, and a signal input unit 30. The configurations of the display unit 10 and the control unit 20 are the same as the units in the first embodiment, and thus, the detailed description will be omitted. The signal input unit 30 includes an operation unit 31, a vehicle signal acquisition unit 32, an illuminance acquisition unit 33, a video acquisition unit 34, a distance acquisition unit 35, a pose acquisition unit 36, and a viewpoint acquisition unit 37. The distance acquisition unit 35, the pose acquisition unit 36, and the viewpoint acquisition unit 37 are connected to the CPU 23.

Distance Sensor 16 and Distance Acquisition Unit 35

The distance sensor 16 measures a distance between the image capturing target and the in-vehicle camera 11. The distance acquisition unit 35 acquires the distance measured by the distance sensor 16 from the distance sensor 16, and transmits the acquired distance to the CPU 23.

Pose Detector 17 and Pose Acquisition Unit 36

The pose detector 17 detects the pose of the rearview display device 1 with respect to the vehicle 2. Specifically, the pose detector 17 detects tilts of the rearview display device 1 around three axes with respect to the vehicle 2. The pose detector 17 is, for example, a mechanical tilt sensor. The pose detector 17 is installed at, for example, a movable part of the rearview display device 1. Accordingly, the pose detector 17 can detect the tilts of the rearview display device 1 around three axes with a certain state of the vehicle 2 as a reference. The pose detector 17 may be an acceleration sensor. In a case where the pose detector 17 is the acceleration sensor, an acceleration is generated in the vehicle 2 by which the vehicle 2 accelerates or the vehicle 2 travels on the slope. In this case, it is not possible to distinguish whether the acceleration is generated due to the tilt of the rearview display device 1 or the movement of the vehicle 2. In a case where the other acceleration sensor is attached to the vehicle 2, it is possible to realize the aforementioned distinguishment. For example, the pose acquisition unit 36 can determine a relative acceleration of the rearview display device 1 using the vehicle 2 as a reference by using the acceleration detected by the pose detector 17 and the acceleration acquired by the other acceleration sensor.

Viewpoint Detector 18 and Viewpoint Acquisition Unit 37

The viewpoint detector 18 detects the viewpoint of the driver. Specifically, the viewpoint detector 18 detects position coordinates of both the eyes of the driver in a three-dimensional space. For example, the viewpoint detector 18 captures the entire face of the driver by a sensor of a camera, and detects the position coordinates of both the eyes of the driver from the captured image by using a face detection algorithm based on machine learning. The viewpoint detector 18 can detect a gaze direction of both the eyes of the driver. The viewpoint acquisition unit 37 acquires the viewpoint of the driver detected by the viewpoint detector 18 from the viewpoint detector 18, and transmits the acquired viewpoint to the CPU 23.

In a case where the mirror image 41 and the conversion video 43 are displayed so as to be superimposed in the rearview display device 1, a parameter value for determining the field of view of the dimming mirror 14 and a parameter value for determining the image capturing range of the in-vehicle camera 11 need to be acquired in advance through the measurement in order to match the appearances thereof presented to the driver. Hereinafter, the details of the parameter for determining the field of view of the mirror image 41 and the details of the parameter for determining the image capturing range of the in-vehicle camera 11 will be described. A specific method for measuring these parameter values will also be described.

Field of View of Dimming Mirror 14

Figure 19:
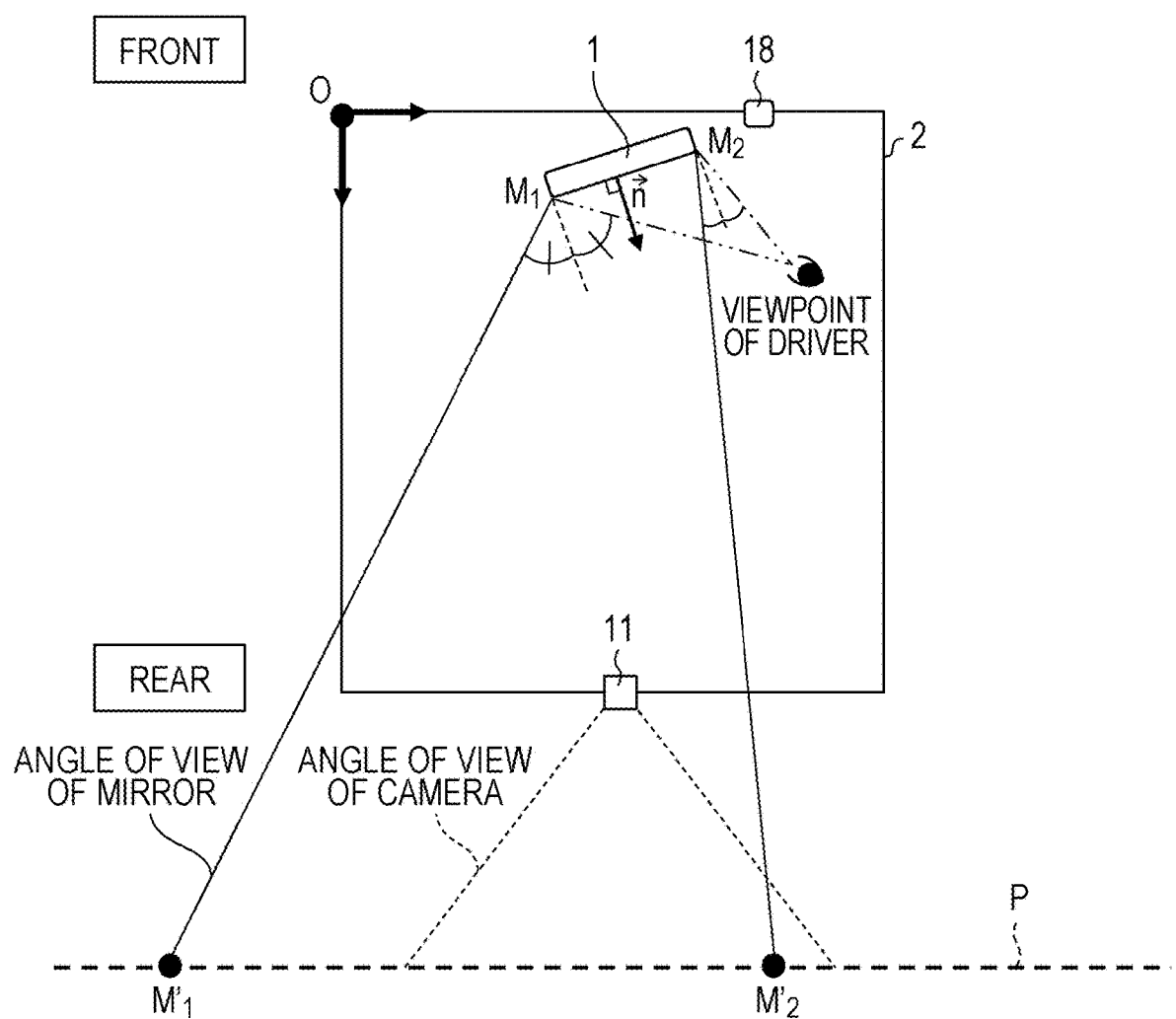
FIG. 19 is a schematic diagram showing a field of view of a dimming mirror and an image capturing range of an in-vehicle camera in the rearview display device according to the third embodiment of the present disclosure.

FIG. 19 is a schematic diagram showing the field of view of the dimming mirror 14 and the image capturing range of the in-vehicle camera 11 in the rearview display device 1 according to the third embodiment of the present disclosure. Initially, the field of view of the dimming mirror 14 will be described.

In FIG. 19, a coordinate system at rest viewed from the vehicle 2 is considered. It is assumed that an origin of the coordinate system at rest is O. It is assumed that the viewpoint coordinates of the driver with respect to the coordinate system origin O of the vehicle 2 is E. It is assumed that position coordinates at both edges of the rearview display device 1 are $M_1$ and $M_2$. It is assumed that a unit normal vector of the display surface of the display 13 on the coordinate system at rest with the vehicle 2 as a reference is expressed by Expression 1.

$$\vec{n}$$ [Expression 1]

It is assumed that the angle-of-view alignment target surface is P. The boundary of the field of view of the mirror image 41 reflected in the dimming mirror 14 is represented by a point $M_1'$ and a point $M_2'$ on the angle-of-view alignment target surface P.

$$\vec{a}, \vec{b}$$ [Expression 2]

$$\angle(\vec{a}, \vec{b})$$ [Expression 2]

In a case where an angle formed by any two vectors expressed by Expression 2 is expressed by Expression 3, the point $M_1'$ and the point $M_2'$ are uniquely determined by the following restriction representing the "law of reflection" saying that an angle of incidence and an angle of reflection are equal to each other".

$$\angle(\overrightarrow{M_1E}, \vec{n}) = \angle(\overrightarrow{M_1M_1'}, \vec{n})(\overrightarrow{M_1E} \neq \overrightarrow{M_1M_1'})$$

$$\angle(\overrightarrow{M_2E}, \vec{n}) = \angle(\overrightarrow{M_2M_2'}, \vec{n})(\overrightarrow{M_2E} \neq \overrightarrow{M_2M_2'})$$ [Expression 4]

As stated above, the angle of view and the field of view of the dimming mirror 14 are determined by the viewpoint coordinates E of the driver, the unit normal vector expressed by Expression 5, the position coordinates $M_1$ and $M_2$ at both the edges of the rearview display device 1, a width between both the edge of the rearview display device 1, and a distance between the rearview display device 1 and the angle-of-view alignment target surface P.

$$\vec{n}$$ [Expression 5]

The viewpoint coordinates E of the driver are different depending on the height and sitting height of the driver. Even in the case of the same driver, there is a possibility that the viewpoint coordinates E are to be changed depending on the adjustment position and angle of the seat and the pose of the driver. Accordingly, the viewpoint acquisition unit 37 acquires the viewpoint coordinates E of the driver detected by the viewpoint detector 18 in real time from the viewpoint detector 18 in real time. The pose acquisition unit 36 calculates, in real time, the unit normal vector of the display surface of the display 13 expressed by Expression 2 based on the pose of the rearview display device 1 detected by the pose detector 17 in real time.

$$\vec{a}, \vec{b}$$ [Expression 2]

The width of the rearview display device 1 can be considered as an invariant constant. Thus, the width of the rearview display device 1 is measured in advance, and is set, as a parameter of a fixed value, for the rearview display device 1.

In a case where a distance between the rearview display device 1 and the in-vehicle camera 11 is $D_1$ and a distance between the in-vehicle camera 11 and the angle-of-view alignment target surface P is $D_2$, a distance between the in-vehicle camera 11 and the angle-of-view alignment target surface P is expressed by $D_1+D_2$. Since the vehicle 2 can be substantially considered as rigid, both the positions of the rearview display device 1 and the in-vehicle camera 11 with the vehicle 2 as a reference can be considered to be unchanged. Accordingly, the distance $D_1$ can be considered as an invariant constant. Thus, the distance $D_1$ is measured in advance, and is set, as a fixed parameter, for the rearview display device 1. The distance $D_2$ is constantly changed during the traveling of the vehicle 2. Thus, the distance acquisition unit 35 acquires the distance $D_2$ measured by the distance sensor 16 in real time from the distance sensor 16 in real time. The rearview display device 1 can measure the distance $D_2$ in real time by using a stereo camera instead of the distance sensor 16.

Image Capturing Range of in-Vehicle Camera 11

The image capturing range of the in-vehicle camera 11 is determined depending on the angle of view of the in-vehicle camera 11, the distance $D_2$ between the in-vehicle camera 11 and the angle-of-view alignment target surface P, the position coordinates of the rearview display device 1 with respect to the coordinate system origin O of the vehicle 2, and the pose of the rearview display device 1 with respect to the coordinate system at rest viewed from the vehicle 2.

The angle of view of the in-vehicle camera 11 is determined depending on a size of the image sensor built in the in-vehicle camera 11, a focal length of the lens built in the in-vehicle camera 11, and an optical center position of the lens. Since these parameter values can be considered to be unchanged during the using of the in-vehicle camera 11, the angle of view of the in-vehicle camera 11 can be considered as an invariant constant. Thus, the angle of view of the in-vehicle camera 11 can be set, as the fixed parameter, for the rearview display device 1 in advance.

The position coordinates of the in-vehicle camera 11 with respect to the coordinate system origin O of the vehicle 2 can be considered to be unchanged. Thus, the position coordinates of the in-vehicle camera 11 can be measured in advance, and can be set, as the fixed parameter, for the rearview display device 1.

The driver adjusts the position of the rearview display device 1 to a position at which it is easy to see the video displayed in the rearview display device 1 by finely adjusting an angle of a housing of the rearview display device 1 during the driving of the vehicle 2. Accordingly, the pose of the in-vehicle camera 11 with respect to the coordinate system at rest viewed from the vehicle 2 is considered to be changed during the traveling of the vehicle 2. Thus, the rearview display device 1 measures the pose of the in-vehicle camera 11 with respect to the vehicle 2 by the pose detector 17 in real time.

There is a possibility that various distortions represented by a barrel distortion and pincushion distortion occur in the camera video 42 due to characteristics of the lens built in the in-vehicle camera 11. In the camera video 42 in which the distortion occurs, since a rectangle of a test pattern located on a surface parallel to an image capturing surface is not projected as the rectangle, on the camera video 42, the distorted camera video 42 is acquired. In a case where the distortion occurs in the camera video 42, even though the field of view of the dimming mirror 14 and the image capturing range of the in-vehicle camera 11 are the same, the camera video 42 is shifted within the image capturing range due to the distortion of the camera video 42. Thus, in order to match the appearance of the mirror image 41 and the appearance of the conversion video 43, the distortion of the camera video 42 needs to be corrected.

An internal parameter and a distortion coefficient of the in-vehicle camera 11 are acquired in advance by calibrating the in-vehicle camera 11, and are set for the rearview display device 1. The video processing unit 24 can correct the distortion of the camera video 42 by using the internal parameter and the distortion coefficient. The video processing unit 24 generates the conversion video 43 by converting the camera video 42 of which the distortion is corrected.

As stated above, the rearview display device 1 according to the present embodiment can uniquely determine the field of view of the dimming mirror 14 and the image capturing range of the in-vehicle camera 11 by using the viewpoint coordinates of the driver, the pose of the rearview display device 1, and the distance corresponding to each pixel of the camera video 42. Accordingly, the rearview display device 1 can determine the enlargement ratio or the reduction rate of the camera video 42 or adjust the cutout position such that a difference between the field of view and the image capturing range is corrected. Accordingly, the rearview display device 1 can match the appearances of the mirror image 41 and the conversion video 43 for the driver with each other.

Example of Process Flow

Figure 20:
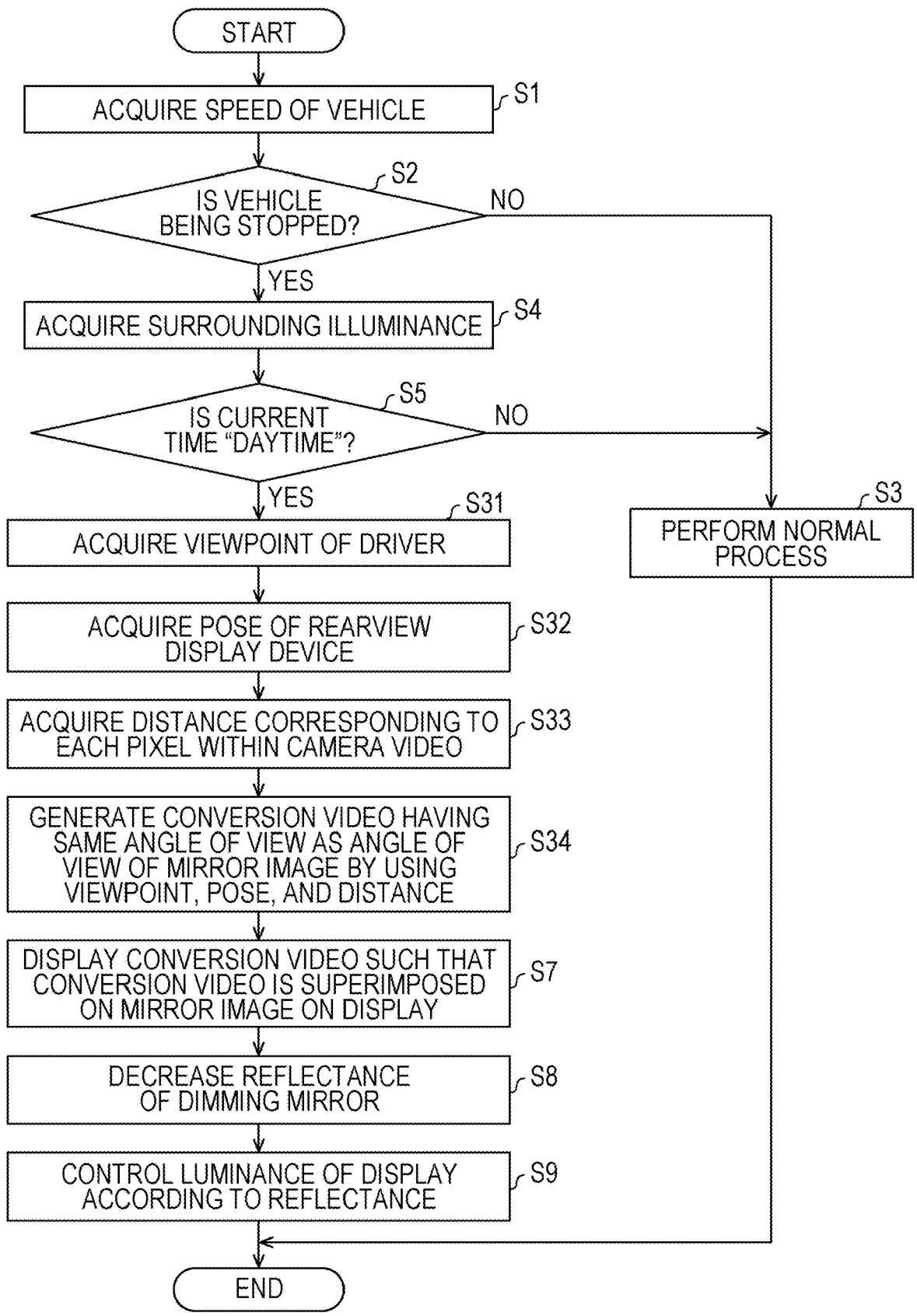
FIG. 20 is a flowchart showing a flow of a series of processes performed by the rearview display device according to the third embodiment of the present disclosure.

FIG. 20 is a flowchart showing a flow of a series of processes performed by the rearview display device 1 according to the third embodiment of the present disclosure. Since the processes of steps S1 to S5 and S7 to S9 among the processes shown in FIG. 20 are the same as the processes shown in FIG. 6, the detailed description will be omitted.

In the case of "YES" in step S5, the viewpoint acquisition unit 37 acquires the viewpoint of the driver detected by the viewpoint detector 18 in step S31. For example, the viewpoint acquisition unit 37 acquires the viewpoint coordinates of the driver. The viewpoint coordinates acquired herein is relative coordinates viewed from the viewpoint detector 18. The viewpoint acquisition unit 37 converts the acquired viewpoint coordinates into the viewpoint coordinates of the driver with respect to the coordinate system origin O by adding the coordinates of the viewpoint detector 18 viewed from the coordinate system origin O to the acquired viewpoint coordinates. The peripheral illuminance of the rearview display device 1 is considerably lowered or the driver looks aside immoderately, and thus, the viewpoint acquisition unit 37 may not acquire the viewpoint coordinates of the driver under an environment in which it is difficult to detect the viewpoint of the driver using the viewpoint detector 18. In a case where the viewpoint coordinates are not able to be acquired, the viewpoint acquisition unit 37 uses, the acquired viewpoint coordinates, predetermined default coordinates set for the rearview display device 1.

In step S32, the pose acquisition unit 36 acquires the pose of the rearview display device 1 detected by the pose detector 17. In this example, a roll angle, a pitch angle, and yaw angle of the rearview display device 1 with respect to the coordinate system at rest with the vehicle 2 as a reference are acquired. In step S33, the distance acquisition unit 35 acquires the distance between the in-vehicle camera 11 and the angle-of-view alignment target surface P corresponding to each pixel within the camera video 42 which is measured by the distance sensor 16. For example, the distance acquisition unit 35 acquires the same number of distances as the number of pixels included in the camera video 42. In step S34, the video processing unit 24 generates the conversion video 43 having the same angle of view as the angle of view of the mirror image 41 by using the acquired viewpoint, pose and distance. The enlargement ratio or the reduction ratio of the camera video 42 for the angle-of-view alignment is determined depending on the distance between the in-vehicle camera 11 and the angle-of-view alignment target surface P. Accordingly, in step S34, the video processing unit 24 individually enlarges or reduces each pixel of the camera video 42 with a magnification corresponding to the pixel by using the distance corresponding to each pixel of the camera video 42. Thereafter, the rearview display device 1 performs the processes of steps S7 to S9.

Modification Example

The rearview display device 1 can alert the driver to gaze at the video of the rearview display device 1 through sound in a case where the driver confirms whether or not the video is inverted. In this case, the rearview display device 1 can refer to the gaze direction of the sightline of the driver detected by the viewpoint detector 18. The rearview display device 1 outputs the sound for alerting the driver to gaze only in a case where the driver does not gaze at the rearview display device 1 by referring to the detected gaze direction of the sightline.

The rearview display device 1 can include a face detector that detects feature points of the entire face of the driver instead of the viewpoint detector 18. The rearview display device 1 can detect not only the sightline of the driver but also the feature points such as the tilt of the entire face of the driver by using the face detector. Accordingly, the rearview display device 1 can refer to the feature points of the entire face of the driver in a case where the driver is alerted to gaze the video of the rearview display device 1. The rearview display device 1 can more effectively alert the driver to gaze by referring to a plurality of feature points as compared to a case where only the gaze direction of the sightline detected by the viewpoint detector 18 is referred to.

A part (for example, video processing unit 24) of the rearview display device 1 according to the first embodiments to the third embodiment can be implemented by a computer. For example, a part of the rearview display device 1 can be implemented by recording a program for implementing control functions of a part of the rearview display device 1 in a computer-readable recording medium, reading the program recorded in the recording medium into a computer system, and executing the program. The "computer system" mentioned herein includes various types of hardware such as an operating system and peripheral devices. The "computer-readable recording medium" is a portable medium such as a flexible disk, a magneto-optical disk, a ROM, and a CD-ROM, and a storage device such as a hard disk built in the computer system. The "computer-readable recording medium" is a medium, such as a communication line in a case where the program is transmitted through a network such as the Internet or a communication circuit such as a phone line, which dynamically retains a program for a short time. A recording medium, such as a volatile memory built in the computer system including a server or a client, which retains the program for a predetermined time during the transmission of the program is included in a kind of "computer-readable recording medium". The program may be used for implementing a part of the control functions. Alternatively, the program may be used for implementing all the control functions by being executed in combination with another program recorded in the computer system.

At least a part of the rearview display device 1 according to the embodiments may be implemented as an integrated circuit such as a large scale integration (LSI). The functional blocks of the rearview display device 1 can be provided as individual processors. A part or all of the functional blocks of the rearview display device 1 may be provided as a processor by being integrated. The integrated circuit is not limited to LSI, and can also be implemented by a dedicated circuit or a general-purpose processor. In a case where a technology of implementing a new integrated circuit that replaces LSI is suggested as a future semiconductor technology advances, it is possible to integrate a part or all of the functional blocks by using this technology.

The present disclosure is not limited to the embodiments, and can be variously changed within the scope described in the claims. Embodiments acquired by appropriately combining technical means disclosed in different embodiments are also included in the technical scope of the present disclosure. It is possible to form new technical features by combining the technical means disclosed in the embodiments.

The present disclosure contains subject matter related to that disclosed in Japanese Priority Patent Application JP 2018-731541 filed in the Japan Patent Office on Sep. 14, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A rearview display device comprising:
a display unit;
a dimming mirror that is disposed so as to be overlapped with a display surface of the display unit, and reflects, as a mirror image, a periphery of a vehicle;
an image capturing unit that generates a video by capturing the periphery of the vehicle; and
a video processing unit that generates a conversion video having an angle of view identical with an angle of view of the mirror image by converting the video, and causes the display unit to display the conversion video such that the conversion video is superimposed on the mirror image,
wherein when causing the display unit to display the conversion video such that the conversion video is superimposed on the mirror image, the video processing unit outputs a message indicating that display for abnormality confirmation including video inversion confirmation is currently performed, and
the display surface of the display unit faces a rear side of the vehicle on which the rearview display device is mounted.
2. The rearview display device according to claim 1, wherein the video processing unit causes the display unit to separately display the conversion video and the mirror image by causing the display unit to display, as a dark video, a part of the conversion video.
3. The rearview display device according to claim 1, further comprising
a luminance control unit that controls a luminance of the display unit according to a luminance of the mirror image.

4. The rearview display device according to claim 1, further comprising
a reflectance control unit that controls a reflectance of the dimming mirror according to a luminance of the display unit.

5. The rearview display device according to claim 1, further comprising:
a luminance control unit that controls a luminance of the display unit according to a luminance of the mirror image; and
a reflectance control unit that controls a reflectance of the dimming mirror according to the luminance of the display unit,
wherein the reflectance of the dimming mirror and the luminance of the display unit are controlled such that the luminance of the mirror image and the luminance of the display unit match with each other.

6. The rearview display device according to claim 2,
wherein the video processing unit causes an image identical with an image of the conversion video or the mirror image which is displayed in an entirety of a display region of the display unit before the separation display to be displayed in a central region of the display region during the separation display.

7. The rearview display device according to claim 1, further comprising:
a vehicle information acquisition unit that acquires vehicle information regarding the vehicle; and
a determination unit that determines whether or not the vehicle stops based on the vehicle information,
wherein the video processing unit causes the display unit to display the conversion video such that the conversion video is superimposed on the mirror image in a case where it is determined that the vehicle stops.

8. The rearview display device according to claim 1,
wherein the video processing unit switches between at least two of a display of the conversion video on the display unit, a display of the mirror image on the display unit, and a superimposition display of the conversion video and the mirror image on the display unit for each predetermined time.

9. The rearview display device according to claim 1, further comprising:
a viewpoint acquisition unit that acquires a viewpoint of a driver;
a pose acquisition unit that acquires a pose of the rearview display device; and
a distance acquisition unit that acquires a distance between the image capturing unit and an image capturing target,
wherein the video processing unit generates the conversion video having the angle of view identical with the angle of view of the mirror image by using the viewpoint, the pose, and the distance.

10. A rearview display device comprising:
a display unit;
a dimming mirror that is disposed so as to be overlapped with a display surface of the display unit, and reflects, as a mirror image, a periphery of a vehicle;
an image capturing unit that generates a video by capturing the periphery of the vehicle; and
a video processing unit that converts the video to generate a conversion video in which a size of the video is reduced, and causes the conversion video and the mirror image to be separately displayed in a display region by causing the conversion video to be displayed in a first region of the display region of the display unit and causing a dark video to be displayed in a second region of the display region except for the first region,
wherein when causing the display unit to display the conversion video and the mirror image, the video processing unit outputs a message indicating that display for abnormality confirmation including video inversion confirmation is currently performed, and
the display surface of the display unit faces a rear side of the vehicle on which the rearview display device is mounted.

11. A rearview display method performed by a rearview display device that includes a display unit, and a dimming mirror which is disposed so as to be overlapped with a display surface of the display unit and reflects, as a mirror image, a periphery of a vehicle, the method comprising:
generating a video by capturing the periphery of the vehicle; and
generating a conversion video having an angle of view identical with an angle of view of the mirror image by converting the video, and causing the display unit to display the conversion video such that the conversion video is superimposed on the mirror image,
wherein in said causing the display unit to display the conversion video such that the conversion video is superimposed on the mirror image, a message indicating that display for abnormality confirmation including video inversion confirmation is currently performed is outputted, and
the display surface of the display unit faces a rear side of the vehicle on which the rearview display device is mounted.

12. A rearview display method performed by a rearview display device that includes a display unit, and a dimming mirror which is disposed so as to be overlapped with a display surface of the display unit and reflects, as a mirror image, a periphery of a vehicle, the method comprising:
generating a video by capturing the periphery of the vehicle; and
converting the video to generate a conversion video in which a size of the video is reduced, and causing the conversion video and the mirror image to be separately displayed in a display region by causing the conversion video to be displayed in a first region of the display region of the display unit and causing a dark video to be displayed in a second region of the display region except for the first region,
wherein when causing the display unit to display the conversion video and the mirror image, the video processing unit outputs a message indicating that display for abnormality confirmation including video inversion confirmation is currently performed, and
the display surface of the display unit faces a rear side of the vehicle on which the rearview display device is mounted.

13. A non-transitory computer readable storage medium storing a program causing a computer to function as the rearview display device according to claim 1, the program causing the computer to function as the units.

* * * * *